United States Patent
Czajka et al.

(10) Patent No.: US 10,582,037 B2
(45) Date of Patent: *Mar. 3, 2020

(54) TWO-WAY PERMISSION-BASED DIRECTORY OF CONTACTS

(71) Applicant: Ginko LLC

(72) Inventors: Ronald J. Czajka, Brighton, MI (US); Sam B. Attisha, West Bloomfield, MI (US)

(73) Assignee: Ginko LLC, West Bloomfield, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/438,939

(22) Filed: Jun. 12, 2019

(65) Prior Publication Data

US 2019/0297181 A1 Sep. 26, 2019

Related U.S. Application Data

(63) Continuation of application No. 15/984,764, filed on May 21, 2018, now Pat. No. 10,397,391.

(60) Provisional application No. 62/509,299, filed on May 22, 2017.

(51) Int. Cl.
| | |
|---|---|
| *H04M 1/725* | (2006.01) |
| *H04L 12/58* | (2006.01) |
| *H04W 4/00* | (2018.01) |
| *H04L 29/08* | (2006.01) |

(52) U.S. Cl.
CPC ........ *H04M 1/72552* (2013.01); *H04L 51/22* (2013.01); *H04L 51/38* (2013.01); *H04L 67/306* (2013.01); *H04M 1/72597* (2013.01); *H04W 4/00* (2013.01)

(58) Field of Classification Search
None
See application file for complete search history.

(56) References Cited

U.S. PATENT DOCUMENTS

| | | | |
|---|---|---|---|
| 5,960,411 | A | 9/1999 | Hartman et al. |
| 6,694,353 | B2 | 2/2004 | Sommerer |
| 6,748,402 | B1 | 6/2004 | Reeves et al. |
| 6,785,367 | B2 | 8/2004 | Horvath et al. |
| 6,873,841 | B1 | 3/2005 | Sagar |
| 6,909,910 | B2 | 6/2005 | Pappalardo et al. |
| 7,194,419 | B2 | 3/2007 | Robertson et al. |

(Continued)

OTHER PUBLICATIONS

"SQL Profiles: Technical Overview" (Oracle, May 2010).

*Primary Examiner* — Said M Elnoubi
(74) *Attorney, Agent, or Firm* — Young Basile Hanlon & MacFarlane, P.C.

(57) ABSTRACT

Systems and methods for creating and joining directories of contacts are provided. A method includes receiving, from a first user device associated with a first user, a first request to create the private directory of contacts, the first request including a directory joining criterion; creating the private directory of contacts; receiving, from a second user device associated with a second user, a second request to join the private directory of contacts; in response to determining that the second user meets the directory joining criterion, adding the second user to the private directory of contacts; and in response to determining that the second user does not meet the directory joining criterion, adding an incoming request, indicative of the second request, to a list of incoming requests of the first user.

20 Claims, 26 Drawing Sheets

(56) References Cited

U.S. PATENT DOCUMENTS

| | | |
|---|---|---|
| 7,606,725 B2 | 10/2009 | Robertson et al. |
| 7,634,509 B2 | 12/2009 | Onyon et al. |
| 7,680,513 B2 | 3/2010 | Haitani et al. |
| 8,588,386 B2 | 11/2013 | Isaacson et al. |
| 9,037,645 B2 | 5/2015 | Czajka et al. |
| 2005/0032527 A1 | 2/2005 | Sheha et al. |
| 2005/0091316 A1 | 4/2005 | Ponce et al. |
| 2007/0061567 A1 | 3/2007 | Day et al. |
| 2008/0189387 A1* | 8/2008 | Lee .................. H04L 51/04 709/217 |
| 2009/0307281 A1 | 12/2009 | McCarthy et al. |
| 2010/0057481 A1 | 3/2010 | Fein et al. |
| 2010/0088246 A1 | 4/2010 | Lim |
| 2010/0217614 A1 | 8/2010 | Brown et al. |
| 2014/0075075 A1 | 3/2014 | Morrill et al. |
| 2014/0122605 A1* | 5/2014 | Merom .................. G06Q 10/10 709/204 |
| 2014/0331318 A1* | 11/2014 | Windsor ............. H04L 63/1441 726/22 |
| 2016/0088139 A1* | 3/2016 | Vance .................. G06Q 10/107 715/763 |
| 2016/0308685 A1* | 10/2016 | Pujic .................. H04L 12/1818 |

\* cited by examiner

TWO-WAY PERMISSION-BASED DIRECTORY OF CONTACTS

CROSS-REFERENCE TO RELATED APPLICATION(S)

This application claims priority to and the benefit of U.S. application patent Ser. No. 15/984,764, filed May 21, 2018, which claims priority to and the benefit of U.S. Provisional Application Patent Ser. No. 62/509,299, filed May 22, 2017, the entire disclosures of which are hereby incorporated by reference herein.

TECHNICAL FIELD

The present disclosure relates to electronic sharing of user data, managing user data of a network, and locating user devices for data exchange.

BACKGROUND

Network management of user data, such as user profile and contact information, can include storage of user information, and storing updates of user information. Social media networks provide platforms for users to post user information for other users to view on user devices.

SUMMARY

Disclosed herein are implementations of methods and systems for a two-way permission-based directory of contacts.

In a first aspect, a method for creating a private directory of contacts is provided. The method includes receiving, from a first user device associated with a first user, a first request to create the private directory of contacts, the first request including a directory joining criterion; creating the private directory of contacts; receiving, from a second user device associated with a second user, a second request to join the private directory of contacts; in response to determining that the second user meets the directory joining criterion, adding the second user to the private directory of contacts; and in response to determining that the second user does not meet the directory joining criterion, adding an incoming request, indicative of the second request, to a list of incoming requests of the first user.

In a second aspect, a system for creating a private directory of contacts including a memory and a processor is provided. The processor is configured is to execute instructions stored in the memory to receive, from a first user device associated with a first user, a first request to create the private directory of contacts, the first request including a directory joining criterion; create the private directory of contacts; receive, from a second user device associated with a second user, a second request to join the private directory of contacts; in response to determining that the second user meets the directory joining criterion, add the second user to the private directory of contacts; and in response to determining that the second user does not meet the directory joining criterion, add an incoming request to a list of incoming requests of the first user.

In a third aspect, a method for creating a directory of contacts is provided. The method includes presenting, on a device of a first user, a first user interface for creating the directory of contacts, where the first user interface includes a first permission indicator of a first permission, a second permission indicator of a second permission, and third permission indicator of a third permission; initiating, from the device, a creation request to create the directory of contacts, where the creation request includes one of the first permission, the second permission, or the third permission; and receiving, on the device of the first user, a confirmation that the directory of contacts is created. The first permission indicates that the directory of contacts is a public directory. The second permission indicates that the directory of contacts is a private-manual directory. The third permission indicates that the directory of contacts is a private-auto directory.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
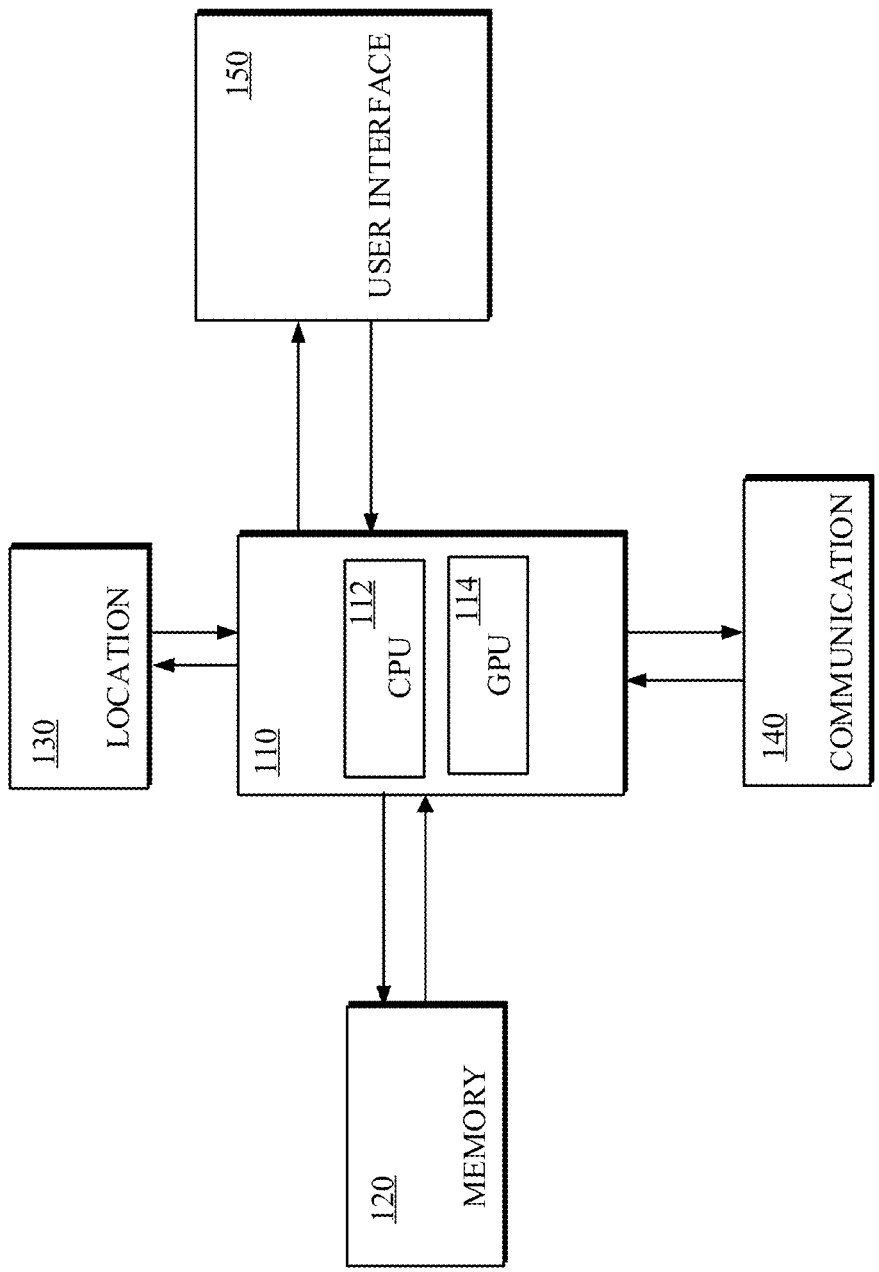
FIG. 1 is a diagram of an example of an apparatus used with a two-way permission-based directory of contacts in accordance with implementations of this disclosure.

Various aspects of this disclosure are now described with reference to the drawings. In the following description, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The present disclosure presents processes and apparatuses for detecting the proximity of contacts relative to a user and sharing contact information between the user and one or more detected contacts. A user of the disclosed processes and apparatuses, including without limitation computer readable instructions executable by the processing unit of the electronic device present disclosure (collectively, the "application"; noting, however, that said term may also include further embodiments as may hereinafter be described or referenced), may receive contact and other information and data (collectively, "user data") from detected contacts (i.e., other users) and send their own user data thereto based in part on the types of information each user elects to share, the nature of the relationship between the users, and the conditions under which any user data may be shared. Generally, each user may receive user data from and transmit user data to other users, for example, by way of a server in communication with each user device, thereby resulting in a real-time exchange of user data, subject to any limitations as may be imposed by each user.

The present disclosure also presents processes and apparatuses for creating and joining a two-way permission-based directory of contacts. The creator of the directory of contacts is referred to herein as the "administrator" or "administrator of the directory." The administrator can set permissions for the directory of contacts. For example, the permissions can indicate whether the directory of contacts is public or private. A public directory of contacts can be discoverable by other users who may join the directory. A private directory, depending on the level of privacy, may not discoverable. Whether discoverable or not, for a user to successfully join a private directory of contacts, one or more additional criteria of the permission may need to be satisfied as described below in illustrative examples.

Depending on the settings of a directory, the directory of contacts can be a two-way permission based directory. A request from an administrator to a user (i.e., an invitee) to join a directory, may have to be accepted by the user before the user is added to the directory. A request to join a directory, initiated by a user and sent to the administrator of the directory, may have to be accepted by the administrator before the user is added to the directory. As such, the directory is a two-way directory. Unless otherwise indicated, or the context indicates otherwise, the terms "directory of contacts," "contacts directory," and "directory" may be used interchangeably in this disclosure.

As used herein, the term "user" includes individuals and entities using the application, for example, at least based on the existence of an account profile belonging thereto. As used in the singular form, "user" may refer to a human user by example. As used in the plural form, "users" may refer to one or more potential contacts and/or registered contacts. Notwithstanding the foregoing, it will be apparent that "user" may include various other embodiments as may hereinafter be described or referenced. "User" can also include an application, a script, an agent, or the like operating on behalf of, triggered by, or the like, a human user.

FIG. 1 is a diagram of an example of an apparatus 100 used with two-way permission-based directory of contacts in accordance with implementations of the present disclosure. The apparatus 100 can also be used for detecting contact proximity and sharing contact information in accordance with implementations of the present disclosure. The apparatus 100 may include a processor 110, a memory unit 120, a location component 130, a communication component 140, a user interface unit 150, or a combination thereof. The apparatus 100 may be an electronic device, which may be, without limitation, a smartphone, personal digital assistant, tablet computer, laptop computer, desktop computer or other Internet-connectable device.

The processor 110 may be one or more various computer processors used to process data and perform computing tasks including without limitation a central processing unit (CPU) 112, and/or a graphical processing unit (GPU) 114 as shown in FIG. 1. In some embodiments, the CPU 112 or GPU 114 may be implemented as a microcontroller, microprocessor, or an application specific integrated circuit (ASIC), or a combination thereof.

The memory unit 120 may be one or more various volatile and nonvolatile memory types including without limitation random access memory, read only memory, flash memory or other removable/non-removable storage media. The memory unit 120 may include a system memory module that may store executable computer instructions that, when executed by the processor 110, perform various user device functionalities including those described herein. The memory unit 120 may store data, including user account information or contact information, entered by the user via the user interface unit 150 or received from the communication component 140.

The location component 130 may include, for example, a global positioning system module or geolocation module, which, based on its configuration, may be in communication with satellite or other external systems used for tracking the location of an electronic device. In some embodiments, the positioning data received by the location component 130 may be one or more of a set of coordinates and a common address (e.g., a street address along with corresponding city, state/province/country information). The location component 130 may identify a location of the apparatus 100 using positioning data. The communication component 140 may send and receive electronic data including, for example, user data. The user interface unit 150 may maintain the user's account profile and user data and the user data of other users, as well as receiving user commands to be processed.

The communication component 140 may include, for example, a modem or other hardware module or adapter for connecting the electronic device to a network, such as an intranet, local network, or the Internet, either through a physical connection (e.g., Ethernet) or wireless connection (e.g., Wi-Fi). In some embodiments, the communication component may connect the user device to, and thereafter communicate with, a server and/or one or more other user devices.

The user interface unit 150 may include one or more units that may register or receive input from a user or present outputs to the user, such as a display, touch interface, a proximity sensitive interface, a light receiving/emitting unit, sound receiving/emitting unit, a wired/wireless unit, or other units. In some embodiments, the user interface unit 150 may include a display, one or more tactile elements (e.g., buttons or virtual touch screen buttons), lights (e.g., LED), speakers, or other user interface elements. The user interface unit 150 may receive user input and provide information to a user related to operation of the apparatus 100. The user interface unit 150 may include, for example, part of a software application installed on and executed by the processor 110 and configured to receive and store user data, contact data and other information stored in the memory unit 120.

In some embodiments, the user interface unit 150 may include a display screen, such as a touch screen, for displaying content and receiving user commands to be processed. The user interface unit 150 may be supported by one or more input configurations including without limitation a keyboard and/or mouse configuration, a touchscreen configuration, and a microphone and speaker configuration. In some embodiments, the user interface unit 150 may include user-selected customization features for creating and maintaining user data in an account profile. For example, the user interface unit 150 may include graphical features to enable the user to establish settings data, which may include various settings for modifying or limiting certain aspects of the software application.

The user data, the contact data, the settings data, or a combination thereof, may be stored within the memory unit 120 of the apparatus 100, within non-transient memory contained within the server, or a combination of both. For example, data associated with the user account profile may be input using the user interface unit 150, which may be immediately stored in memory unit 120 of the apparatus 100, and may be transmitted via the communication component 140 to a network server for storage in the network database within the server memory. The user data, contact data, and settings data may be communicated to the server periodically or in response to data changes, for example, to update contact data registered with various users or record select user preferences.

The account profile of the user may include user data of the user, which is viewable at least in part by certain other users. For example, "registered contacts" referred herein as network users with whom user data is being shared with the user, may view user data of the user. In some embodiments, the account profile may comprise various graphical features. For example, a picture (which may include without limitation a photograph, a computer generated image, a solid color, or a patterned image) may be uploaded to use as the background for the user account profile, or a picture may be retrieved from a library provided by the application or server. In some embodiments, the various media files, such as video, audio and picture files, may be uploaded to the account profile and made available for viewing by other users. For example, an entity user may upload commercials or other marketing materials to the account profile to promote goods and services to potential customers.

The user data may include information relative to an account profile of a user and may comprise name, title, company, availability status, account picture, phone and mobile numbers, mailing addresses, email addresses, facsimile numbers, social media links, websites, birthday, anniversary, and/or other information associated with the user. The user data may be received from a user interface. In some embodiments, user data may further include present and past location data for the user. The user data may be organized into one or more profiles (e.g., a work profile comprising the user's business contact information and a home profile comprising personal contact information), to permit the user to conveniently elect for only certain profiles to be publicly viewable, and/or to distinguish professional and personal user data for presentation to other users.

The contact data may include user data relative to registered contacts, which may be viewable by the user, for example, as a contact list accessible within the application. In some embodiments, the registration of further contact data or modification of existing contact data for a registered contact may be automatic according to user-based configuration by the user. In some embodiments, the registration of further contact data or modification of existing contact data for a registered contact may be received from a user interface in response to user entry. As an example of automatic modification, a registered contact of the user may elect to no longer share certain contact data with the user, permissions for the contact data relative to the user may be changed by the registered contact, thereby causing that contact data to no longer be viewable by the user. The contact data may be organized into one or more profiles as set by the corresponding user.

The settings data may include settings configured by the user device in accordance with selections by the user. In some embodiments, the settings data may be input to the user device via a user interface, such as the user interface unit 150 of FIG. 1. For example, an application may be executed to graphically display various configurable settings on a touch screen, and in response to user input, record and save the settings data to a memory of the user device, such as the memory unit 120. The settings data may be sent to a network server and stored in a memory unit of the network server as parameters when executing data sharing and detection of potential contacts in accordance with this disclosure. In some embodiments, the settings data may include a proximity range setting, a detection preferences setting, a user data setting, or a combination thereof.

The proximity range setting may indicate a particular proximity range relative to the user device location, within which searching and detecting of other users may be executed, such as searching and detecting potential contacts for the user within a two mile radius of the user's present location. In some embodiments, a network server may receive the proximity range setting from the user device, and may identify other users concurrently located within proximity of the user corresponding to the proximity range setting. In some embodiments, the user device may include a location detection function that uses peer-to-peer signals with a user device of another user located within a proximity of the user as defined by the proximity range setting. The proximity range setting may be fixed and unchangeable, or may be adjustable by the user.

The detection preferences setting may be defined by the user and may identify other users individually or a classification of users as potential contacts to be detected within the proximity range. For example, the detection preferences setting may be set to allow all users to be detected, or it may instead allow only certain selected users (e.g., entities that are restaurants, users identified by a first name, age, or gender, or other criteria) to be detected.

The user data setting may indicate the degree to which the user data (or specific portions thereof) is viewable by other users. In some embodiments, the user may define all or select portions of the user data as being public user data (i.e., automatically viewable by other users) or private user data (i.e., only viewable by other users upon the user granting permission therefor). The user may modify the user data setting from an initial setting. For example, the user data setting for a portion of the user data may be changed from public user data to private user data, and vice versa.

Based on the settings data, the server may detect other users located within the defined proximity range. Users who have not previously shared user data with the user, as well as users who have, but who no longer are sharing user data with the user, may be defined as "potential contacts." Users who are currently sharing user data with the user may be defined as "registered contacts." In some embodiments, upon detecting a potential contact, the user may send an exchange request to the potential contact by electing to share all user data, some user data, or no user data with the potential contact, provided that user data defined as public may automatically be shared upon initiating the exchange request. Upon the potential contact and the user each agreeing to share user data with one another, the user and the potential contact each become registered contacts to one another, and user data of the potential contact may be shared with the user as contact data and vice versa. In some embodiments, the user and a potential contact or registered contact may elect to enter into a private chat wherein they may communicate messages to each other.

Figure 2:
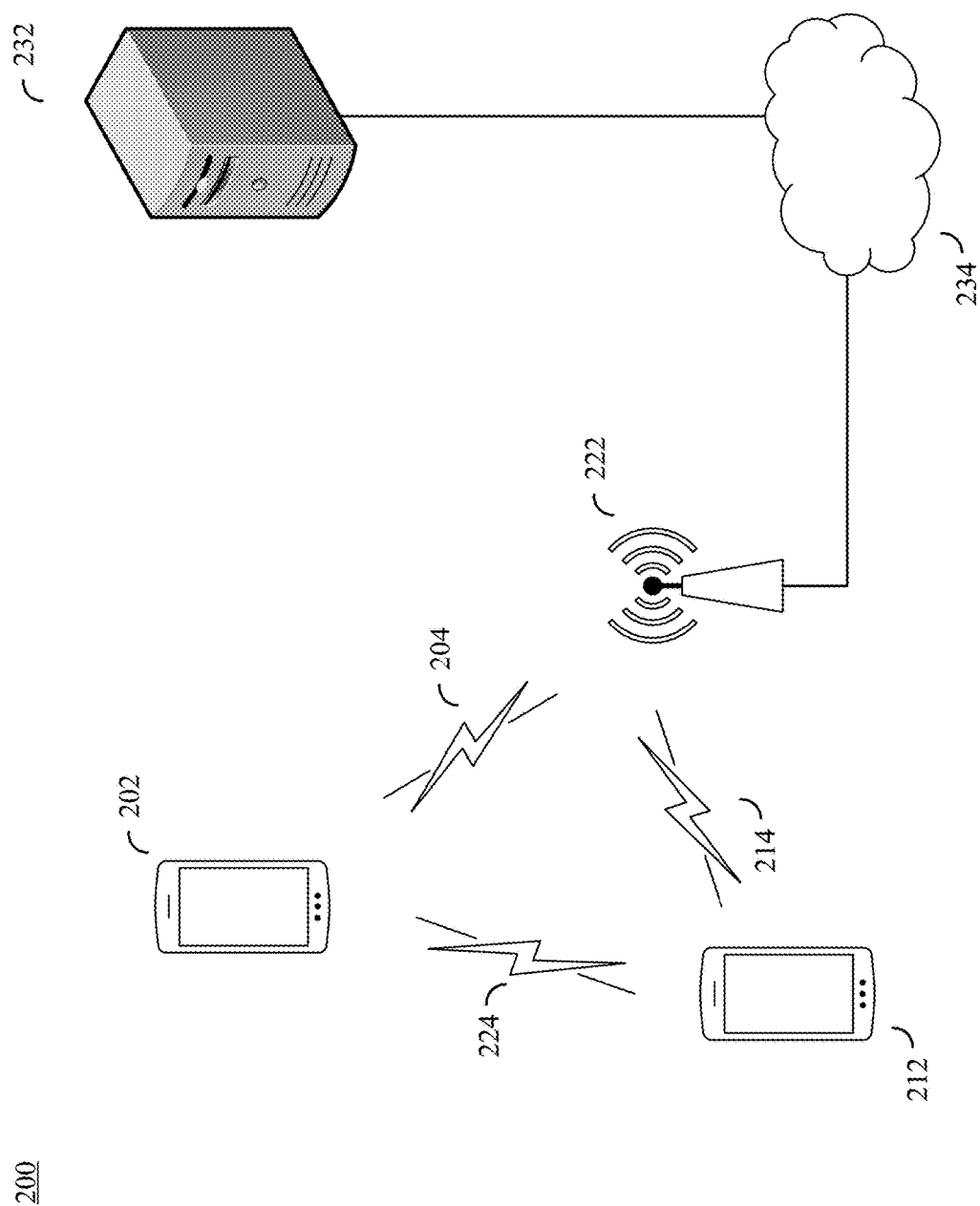
FIG. 2 is a diagram of an example of a system used with a two-way permission-based directory of contacts in accordance with implementations of this disclosure.

FIG. 2 is a diagram of an example of a system 200 used with a two-way permission-based directory of contacts in accordance with implementations of the present disclosure. The system 200 can also be used for data sharing between devices based on relative proximity in accordance with implementations of the present disclosure. In some embodiments, the system 200 may include a user device 202, which may be configured as shown and described herein with reference to apparatus 100 in FIG. 1. The system 200 may also include one or more other user devices, such as the user devices 212, a network access point 222, and a network server 232. The system 200 may also include communication links 204/214/224 and network 234.

The user device 202 may communicate with the network entities via communication link 204, and may access the network server 232 via a network 234. In an example, the network 234 can be the Internet and the communication link 204 can be an internet connection. The one or more other user devices may be located within the proximity range as defined by the proximity range setting. In some embodiments, the user device 202 may communicate with the network server 232 to set up the account profile of the user and to upload the settings data onto the network server 232. The network server may detect the one or more user devices 212 as being associated with potential contacts for the user of user device 202 in response to an action by the user. For example, the user may open (e.g., start, launch, execute, etc.) an application on the user device 202, which may automatically send a signal on communication link 204 to the network access point 222 and forwarded to the network server 232 over the network 234. The signal may include the location data and/or the settings data of the user device 202. Meanwhile, one or more other users registered with the network on associated user devices 212 may have communicated respective location data to the network server on communication link 214 via the network access point 222 and the network 234. Based on the location data and/or settings data received from the user devices 202/212, the network server 232 may identify one or more user devices 212 as being located within the proximity range as set by the user device 202, and as such, are identified as potential contacts for the user of user device 202. In some embodiments, the user devices 202/212 may exchange location data directly, such as through the communication link 224, which may then be transmitted to the network server 232. In some embodiments, the communication link 224 may be a peer-to-peer communication link.

In some embodiments, the user device 202 may receive an indication from the network server 232 of user devices 212 associated with potential contacts, as identified by the network server 232. The user device 202 may display the potential contacts on a user interface, from which a potential contact may be selected for exchanging user data, such as contact information. The user device 202 may send the potential contact selection to the network server via the communication link 204. In response to the potential contact selection, the network server 232 may send a request to the user device 212 of the potential contact for exchanging contact information with the user of user device 202. If the potential contact agrees to exchange data with the user of user device 202, the data sharing may be transmitted via the network over communication links 204/214, or the data sharing may be transmitted directly via the communication link 224. In some embodiments, the user and the new contact may commence a chat session via the network over communication links 204/214, or the chat session may be transmitted directly via the communication link 224, which can be a peer-to-peer communication link. For example, a user sharing application may be activated on both the user device 202 and the user device 212 of the new contact, which enables a chat session to be initiated by either the user or the new contact.

Figure 3:
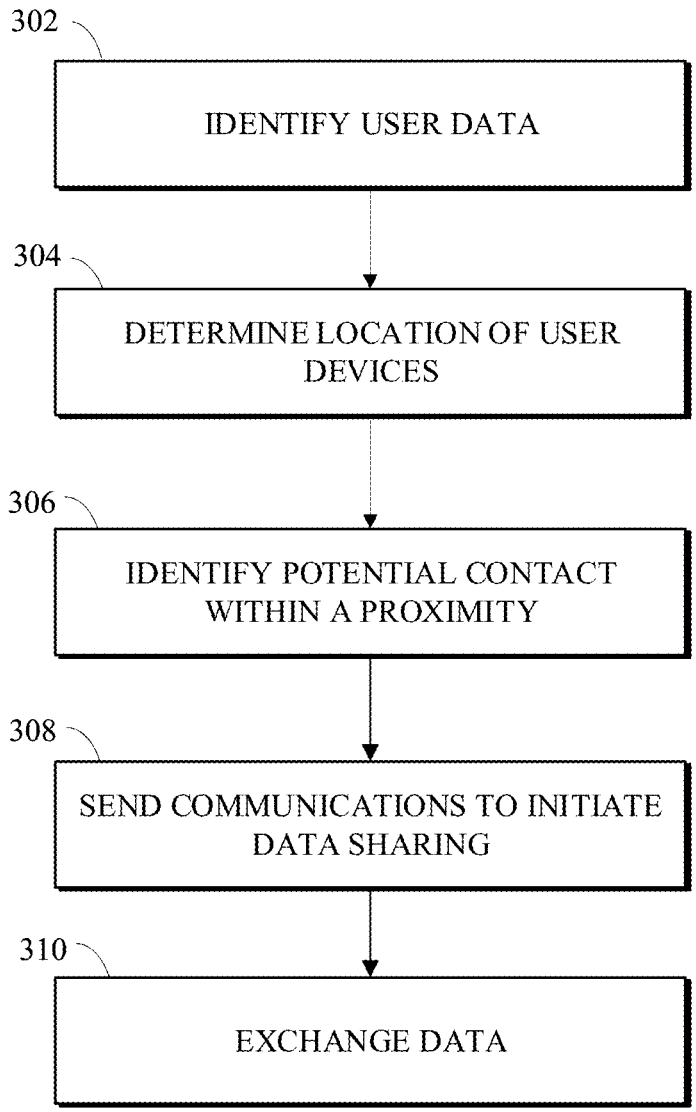
FIG. 3 is a flowchart diagram of an example of a process for data sharing between devices of FIG. 2 based on relative proximity in accordance with the implementations of this disclosure.

FIG. 3 is a flowchart diagram of an example of a process 300 for data sharing between devices of FIG. 2 based on relative proximity in accordance with the implementations of the present disclosure. The process 300 may include identifying user data of a user at 302, determining a location of the user at 304, identifying a user device of a potential contact located within a defined proximity of the location of the user at 306, sending communications to initiate data sharing at 308, exchanging the data between the user the potential contact at 310, or a combination thereof.

In some embodiments, the process 300 may be implemented as a computer readable medium that stores instructions executable by processor. In some embodiments, the instructions may be stored in a memory, such as a memory in the network server 232 of FIG. 2, and may be executed by one or more processors in the network server 232. In some embodiments, the process 300 may be executed by the network server 232 to enable data sharing between user devices, such as the user device 202 and the one or more other user devices, such as the user devices 212.

In some embodiments, the user data for registered users may be identified by the network at 302. For example, the user profile of each user includes the contact information of the user, which is recorded during registration and stored by the network server 232. Any updates to the contact information may be based on user input at the user device, and may be recorded and stored by the network server 232.

In some embodiments, the location of the user device 202 may be determined at 304. As detection of potential contacts is dependent upon location data of the user, the network server 232 regularly identifies the location of the user device 202 based on location data determined by the location component and transmitted by the communication component of the user device, such as location component 130 and communication component 140 of FIG. 1. In some embodiments, the communication of location data to the server may be dependent upon the location component 130 being enabled (e.g., wherein the electronic device is a smartphone, the GPS feature must be enabled in order for the user's location data to be communicated).

In some embodiments, a potential contact located within the selected proximity range may be identified at 306. The network server 232 may maintain records of location data for all user devices in communication with the network server 232. The location of other user devices 212 may be computed, for example, by calculating the distance between the user device 202 and other user devices 212. In the event that other user devices, such as one or more of the user devices 212, are determined to be within the proximity range defined by the settings data, and subject to any detection preferences defined by the user, such other user devices as the one or more of the user devices 212 may be detected by the network server 232 based on the location data. In some embodiments, the network server 232 may notify the user that potential contacts are nearby. For example, the user device 202 may receive the notification of potential contacts, and execute a visual display for identifying the locations of potential contacts, such as by visually denoting the locations on a map. The user may then select one or more detected users to share user data with, subject to each user's user data settings.

In some embodiments, the network server may generate and send messages between the user and the potential contact related to data sharing at 308. For example, in response to the user's selection of a potential contact, a request message may be sent from the user device 202 indicating a request for an invitation message to be sent to the potential contact. The request message may include a permission setting indicating which user data and/or which user data profile of the user is selected to be shared with the potential contact. Responsive to receiving the request message, the network server 232 may generate and deliver the invitation message to the user device 212 of the potential contact. A response message may be sent from the user device 212 of the potential contact indicating acceptance or denial of the invitation. Responsive to receiving the response message, the network server 232 may generate and deliver a response message to the user device 202.

In some embodiments, the user device 202 may send the exchange request (e.g., via an electronic message) to the potential contact, via the network server 232, which the potential contact may accept, for example, by similarly selecting to share user data or entering into a chat conversation with the user. The potential contact may decline the exchange request, for example, by refusing to share any user data or refusing to enter into the chat conversation.

In some embodiments, the user device 202 may exchange data with the user device 212 of the selected potential contact at 310. The user and potential contact may each select which user data is to be shared. For example, the data exchange may be limited based on permission settings elected by the user and/or the potential contact. In response to the network server 232 receiving a message from a user device, such as the user device 202 or one of the user devices 212, of the potential contact identifying the potential contact's user data selected to be shared with the user, such as according to a permission setting, the network server 232 may send the an acceptance response message to the user device 202. The network server 232 may designate the user and the potential contact as registered contacts to each other, and the user data selected to be shared by the user and the potential contact may be registered as contact data respectively. The network server 232 may execute the data sharing by sending user data of the user, such as contact information, to the user device 212 of the registered contact, and by sending user data of the potential contact, such as contact information, to the user device 202.

Figure 4:
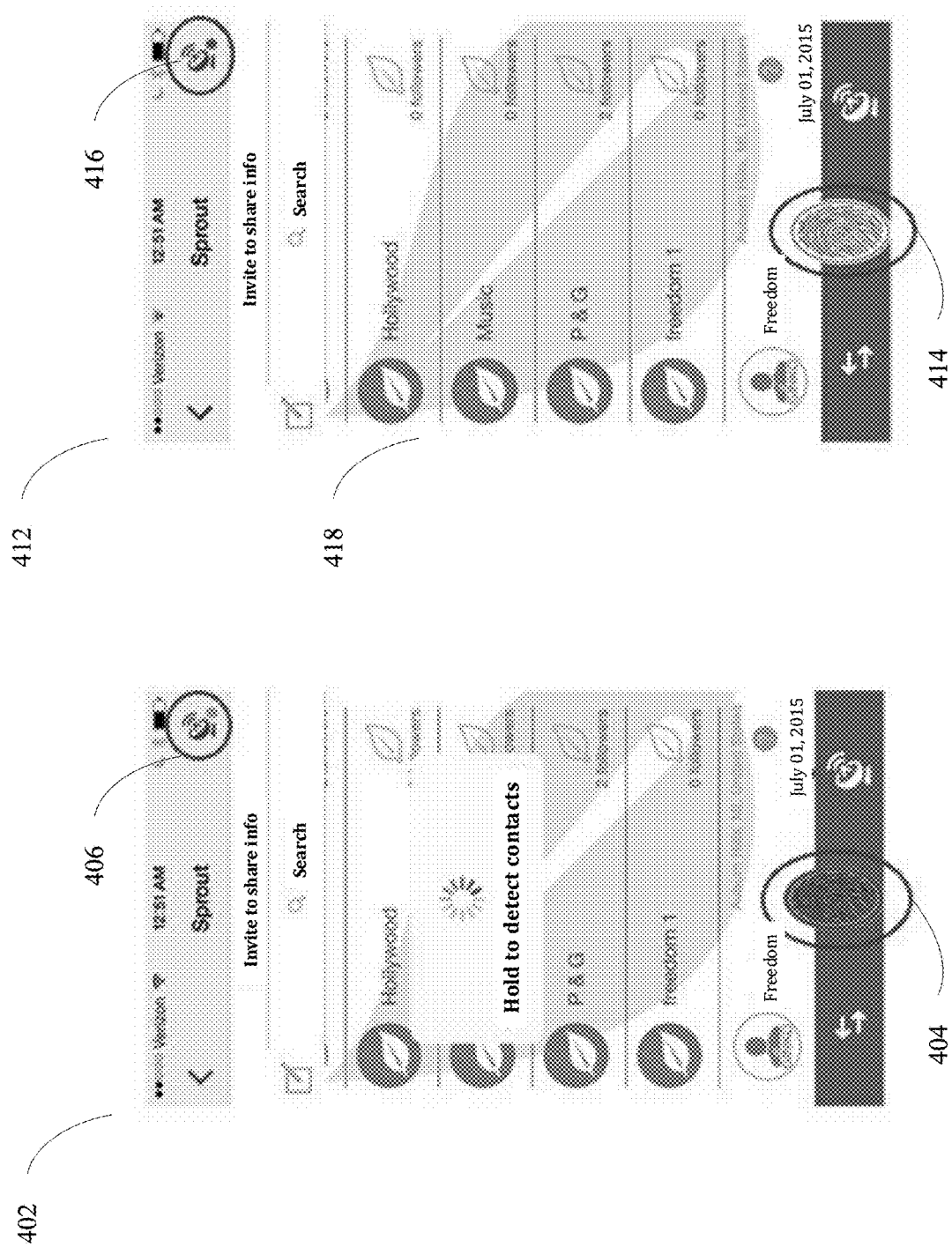
FIG. 4 is a diagram of an example of a user interface for in accordance with implementations of this disclosure.

FIG. 4 is a diagram of an example of a user interface display for detecting contacts responsive to user input in accordance with implementations of this disclosure. In some embodiments, the user device 202 may display an application interface display 402 for initiating a detection of contacts, and after an elapsed time duration of the detection, an application interface display 412 for indicating the results of the detection of contacts may be displayed. For example, the application interface display 402 may include a detection start icon 404 to enable the user to commence a request for detection of potential contacts in the vicinity of the user device, and a detection icon 406 that may provide an indication of status for the detection being processed by the network server. For example, the user device may respond to the user touch and/or holding the touch of the detection start icon 404 by sending location information of the user device to the network server. In some embodiments, the location component 130 of FIG. 1 may remain active for as long as the activation feature is manually toggled by the user touch of detection start icon 404. In some embodiments, the detection start icon 404 may respond only to a unique identifier, such as the user's fingerprint. The application interface display 402 may provide visual feedback that may include, for example, a color change or blinking of detection icon 406 to indicate status of the detection, which may include that the detection is in progress. The application interface display 412 may include a detection icon 416 for detection status indication, such as indicating that the detection processing is completed by changing the appearance of the detection icon 416 from detection icon 406 and/or a change in appearance of detection start icon 414 compared to detection start icon 404. Contact display region 418 may indicate the results of the detection process by identifying user identification or tags of potential contacts found to be within the proximity range defined in the proximity range setting.

Figure 5:
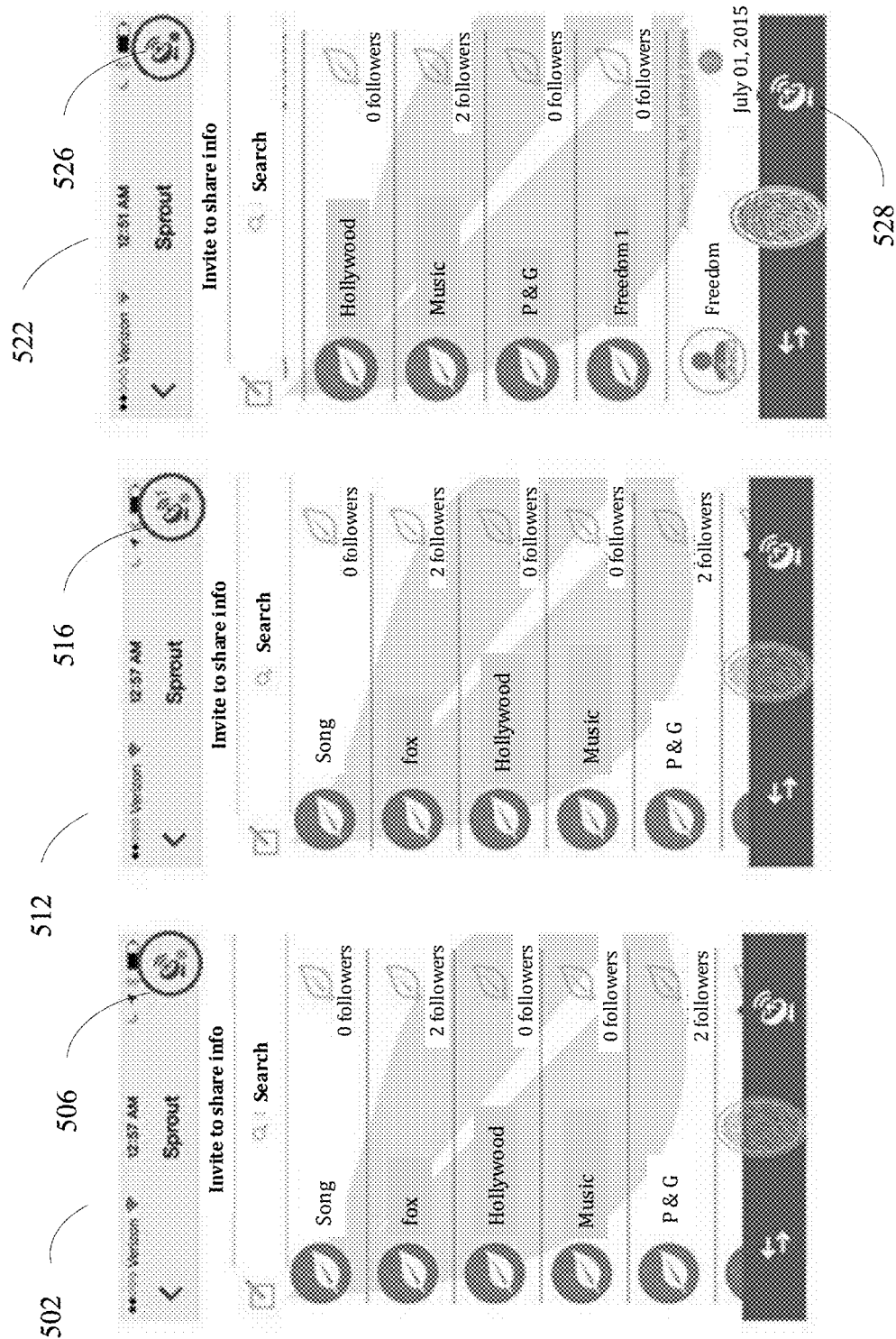
FIG. 5 is a diagram of an example of a user interface display for detecting contacts automatically in accordance with implementations of this disclosure.

FIG. 5 is a diagram of an example of a user interface display for detecting contacts automatically in accordance with implementations of this disclosure. In some embodiments, the user device 202 may display an application interface display 502 for an automatic detection mode, an application interface display 512 for indicating a status change for detection of potential contacts, and an application interface display 522 that indicates that automatic detection mode has been toggled off. For example, the application interface display 502 may include a detection icon 506 that may indicate an automatic detection mode for detecting potential contacts in the vicinity of the user device, such as by a visual indication that may include an icon color. The application interface display 512 may include a detection icon 516 that may indicate a new potential contact has been automatically detected, such as by a visual indication that may include a numeral corresponding to a number of new potential contacts detected. The application interface display 522 may include a detection mode icon 528 that enables a user to toggle between automatic detection mode and user initiated detection mode, and a detection icon 526 that may indicate the status change for the automatic detection mode, such as by a change in icon color.

In some embodiments, the user activated contact detection of FIG. 4 may enable a single one-time detection search by the network server, which may conserve resources of the user device and the network. In some embodiments, automatic contact detection of FIG. 5 may enable contact detection continuously while the automatic mode is activated. For example, automatic contact detection mode may be activated by toggling one or more activation features, that may include activating the location component 130 of FIG. 1 for an unspecified period of time (e.g., until the user subsequently deactivates the location component 130), and activating the location component 130 for a specified period of time (e.g., one hour). For example, tapping the detection icon 506 once may trigger contact detection activation for an unspecified period of time, tapping the detection icon 506 twice may trigger contact detection activation for a specified period of time, and tapping the detection icon 506 three times may deactivate the location component 130 and the contact detection process. The activation features for contact detection described herein are provided as examples, and other ways of user activation and automatic activation are possible for implementations of this disclosure.

Figure 6:
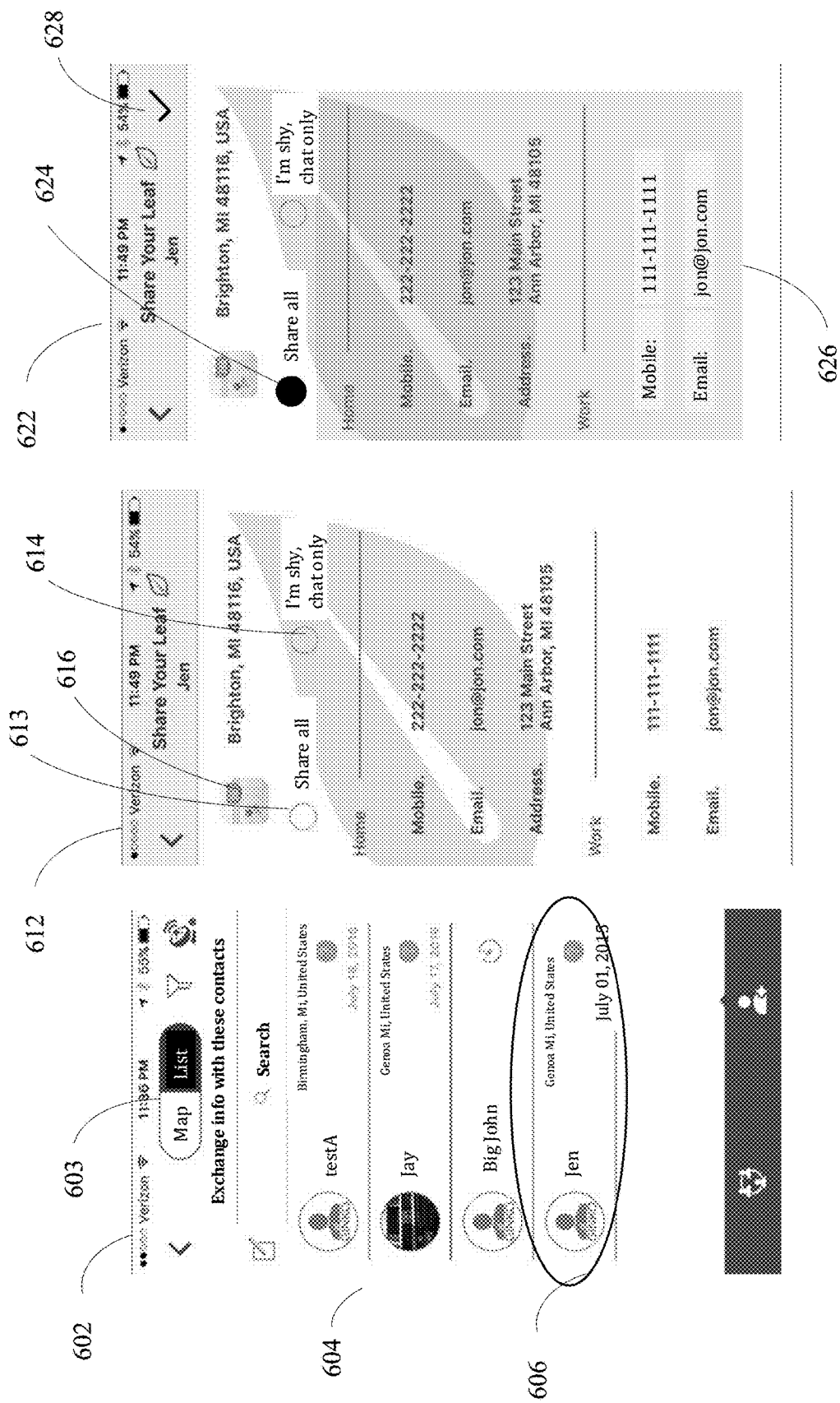
FIG. 6 is a diagram of an example of a user interface display for selecting user data for data sharing in accordance with implementations of this disclosure.

FIG. 6 is a diagram of an example of a user interface display for selecting user data for data sharing in accordance with implementations of this disclosure. In some embodiments, application interface displays 602/612/622 may display information related to data sharing between the user and a potential contact identified by the contact detection of FIGS. 4 and 5. For example, the application interface display 602 may show registered contact identifications 604 and potential contact identifications 606 that may be distinguishable by having a different visual appearance or graphical representation. In some embodiments, the registered contact identifications 604 and potential contact identifications 606 may be displayed in a list format, as shown, in response to a user input at format icon 603 selecting a list format, such as by a touch screen tapping. The registered contact identifications 604 and potential contact identifications 606 may be arranged in the application interface display 602 in various ways, including alphabetically, by proximity to the user, time of detection, or based on frequency of previous exchanges. A data exchange with a potential contact may be initiated by the user device 202 in response to receiving user input, such as by tapping the potential contact identification 606 associated with the potential contact. The user device 202 may send a request signal to the network server 232 identifying the selected potential contact and indicating the user's request for sending an invitation for data exchange from the user device 202 to the device 212 of the potential contact.

In some embodiments, the application interface display 612 may be displayed in response to the request to exchange data, and may include selectable user data of the user, from which the user may select which user data of one or more user profiles to share with the potential contact. For example, the application interface display 612 may provide options for the user to share all data via icon 613, selectively share only certain user data (e.g., only certain profiles or portions thereof), or share no user data and instead request to enter into a chat conversation with the potential contact, by selection of chat only icon 614 for example.

In some embodiments, location region 616 of the application interface display 612 may indicate a location for the user device when the user device associated with potential contact identification 606 was detected by the network and identified to the user device 202.

In some embodiments, the application interface display 622 may indicate the user selection for user data for the data exchange. For example, a share all icon 624 may be responsive to user input, such as by touch screen tapping the icon 624, and all user data of the display may be visually altered for feedback display, such as shown by a highlighted region 626, to indicate confirmation by the user device 202 for the user selection. In some embodiments, the application interface display 622 may provide an interface for the user to accept the selected data sharing information, such as by touch screen tapping the accept icon 628. In response to the user input at the accept icon 628, the user device 202 may execute a data sharing request to the network server 232.

In some embodiments, the user device 202 may provide global user data changes by the user. For example, an application interface display may be presented to the user on the user interface unit 150 which shows the user data for all user profiles of the user as recorded on the network server 232. The user data profiles may be edited at any time by the user, allowing all registered contacts to have access to current user data once the user data is edited by the user and saved to the network server 232. Unlike with one-off transmissions of contact information, or exchanging of business cards, the user need not redistribute updated contact information since the update may be global via the central repository in the network server 232.

Figure 7:
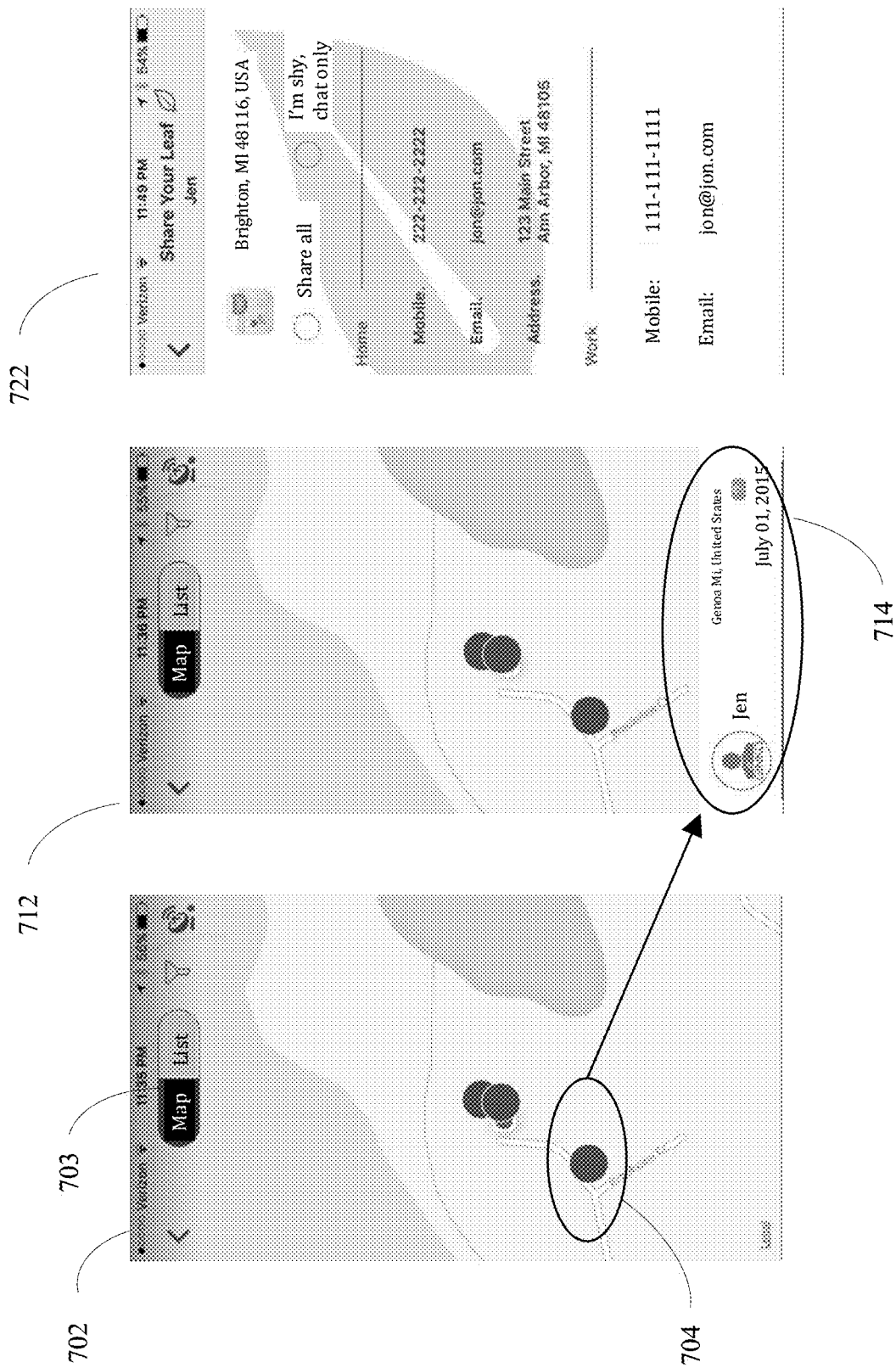
FIG. 7 is a diagram of an example of a user interface display for identifying a potential contact based on location in accordance with implementations of this disclosure.

FIG. 7 is a diagram of an example of a user interface display for identifying a potential contact based on location in accordance with implementations of this disclosure. In some embodiments, an application interface display 702 may display location information related to potential contacts, such as on a map, in response to user input at format icon 703, which may provide a selectable display for potential contacts in a map format or list format. For example, in response to user input selecting map format at format icon 703, such as by a touch screen tapping, the application interface display 702 may show markers 704 representing potential contacts in respective map locations. In some embodiments, a user input selection of a marker 704 may trigger a generation of an application interface display 712 which may show an identifier region 714 for the potential contact associated with the selected marker 704. In response to a user input, such as by touch screen tapping at the identifier region 714, an application interface display 722 may be generated for presenting selectable user data for sharing with the selected potential contact. The user may interface with the application interface display 722 as shown and described herein with respect to FIG. 6.

Figure 8:
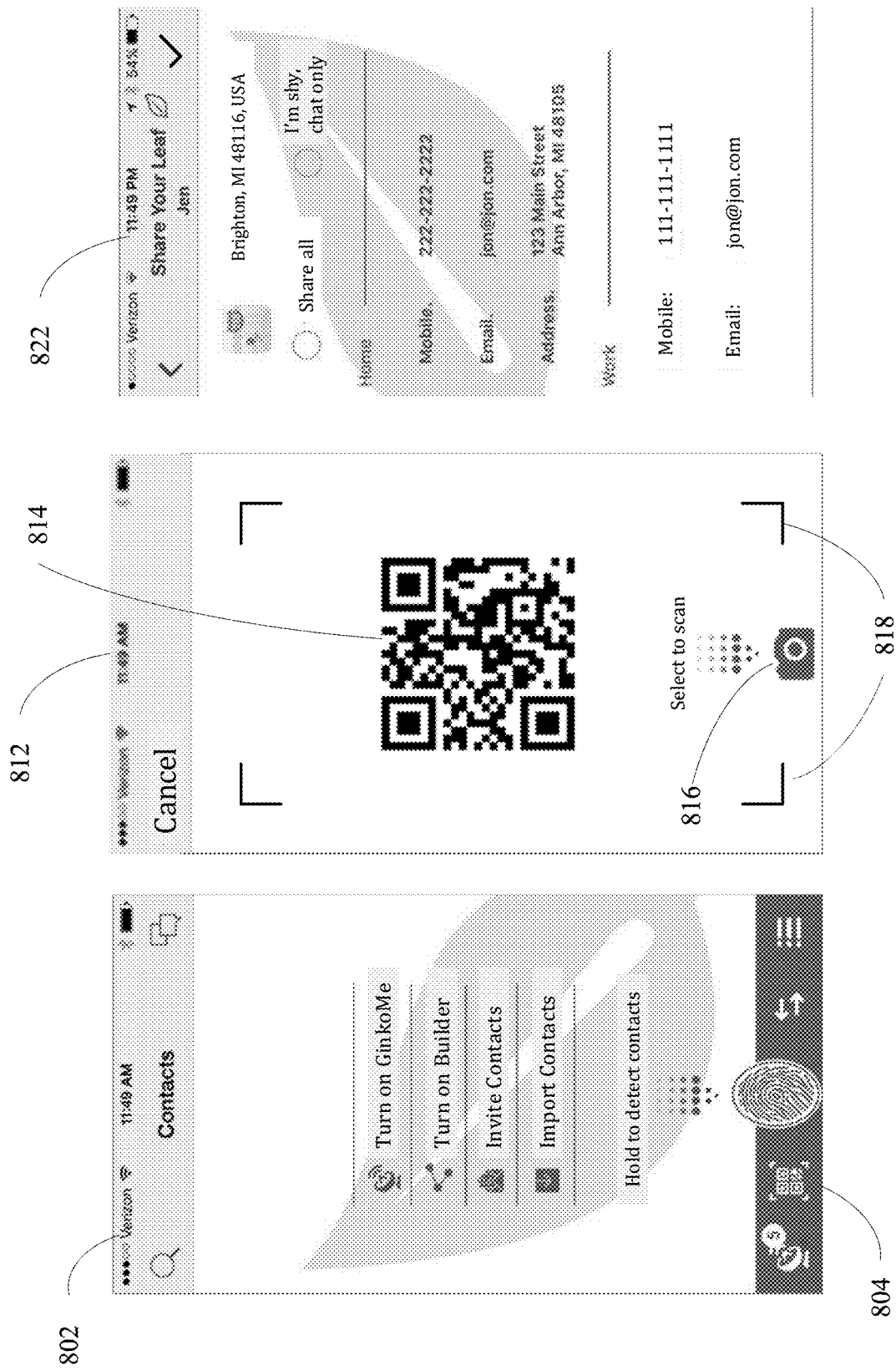
FIG. 8 is a diagram of an example of a user interface display for identifying a potential contact by scan code in accordance with implementations of this disclosure.

FIG. 8 is a diagram of an example of a user interface display for identifying a potential contact by scan code in accordance with implementations of this disclosure. In some embodiments, an application interface display 802 may display a contacts screen, including a scan icon 804 for permitting interfacing with another user device. For example, in response to a user input at the scan icon 804, such as by a touch screen tapping, an application interface display 812 may be generated and a camera in user device 202 may be activated for capturing a scan code display of a user device associated with a potential contact. In some embodiments, in response to the camera of the user device 202 being aimed at a scan code, the application interface display may show the scan code 814 as captured by the camera, and may provide markers 818 as a view finder to assist the user in centering the scan code for the camera to focus. The camera icon 816 may be responsive to a user input, such as by a touch screen tapping or sliding, and may execute the scan of the scan code. An application interface display 822 may be generated in response to the scan execution, which displays the selectable user data screen from which the user may input whether to share all user data, share some user data, or chat only, in a manner as shown and described herein with respect to FIG. 6.

Figure 9:
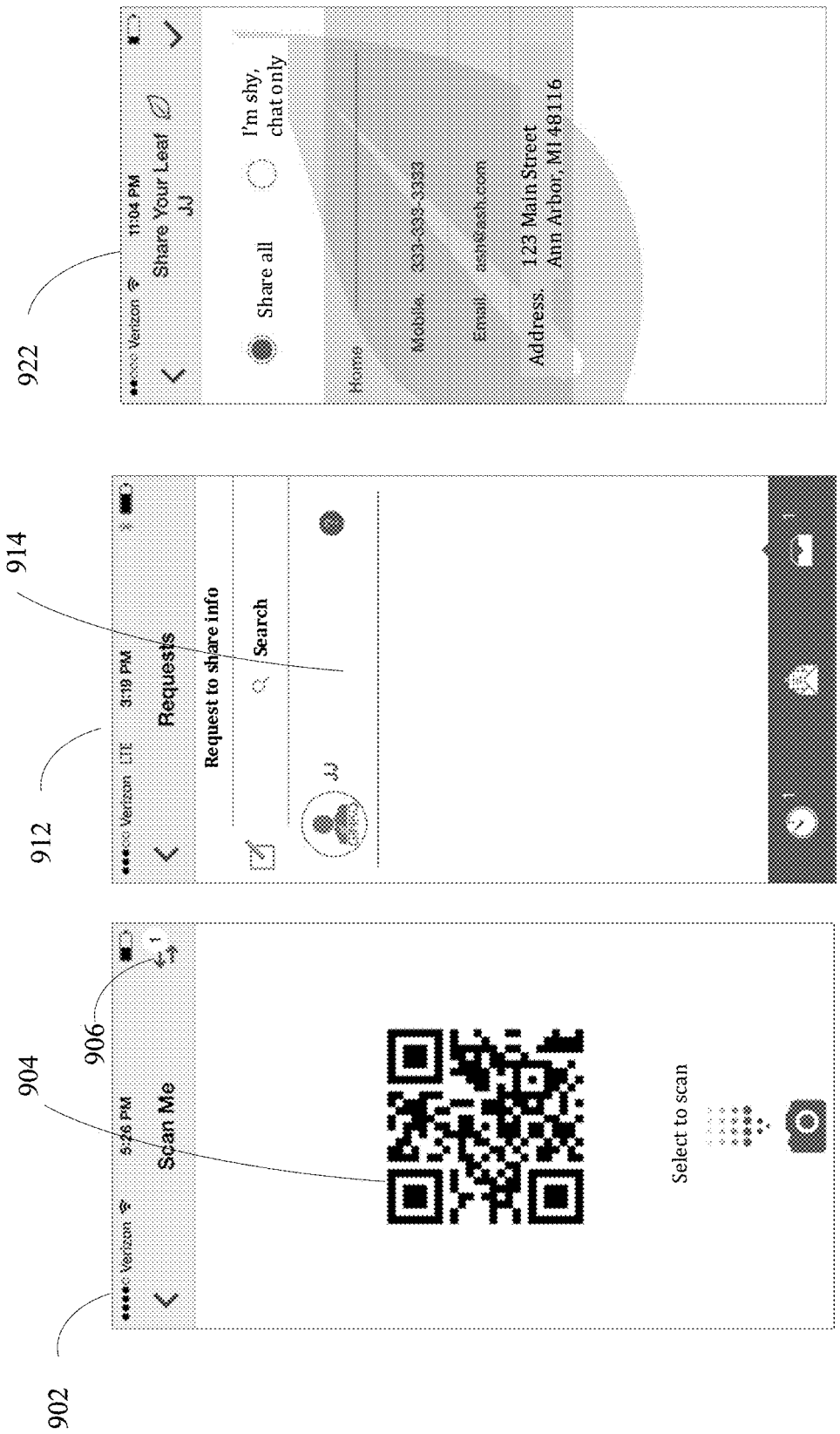
FIG. 9 is a diagram of an example of a user interface display for sharing user data by scan code in accordance with implementations of this disclosure.

FIG. 9 is a diagram of an example of a user interface display for sharing user data by scan code in accordance with implementations of this disclosure. In some embodiments, an application interface display 902 may display a scan code 904 so that another user device may read the scan code for identification as a potential contact. For example, the user device associated with scan code 904 of the application interface display 902 may be presented to another user device that operates the scan code reader, such as the user device 202 that displays captured scan code 814 in FIG. 8, where the captured scan code 814 corresponds to the scan code 904 displayed on the application interface display 902. In some embodiments, in response to receiving a request for user data sharing from another user device, such as the user device of FIG. 8, the application interface display 902 may display an indication of the received request at pending exchange icon 906, which may be responsive to user input. For example, in response to a user input at pending exchange icon 906, such as by a touch screen tapping, an application interface display 912 may be generated to display the potential contact identifier 914, which may be responsive to user input for accepting the request. In some embodiments, an application interface display 922 may be generated in response to the user input at the potential contact identifier 914, to provide selectable user data for exchange to the requester. For example, the user may input at the application interface display 922 whether to share all user data, share some user data, or chat only, in a manner as shown and described herein with respect to FIG. 6.

Figure 10:
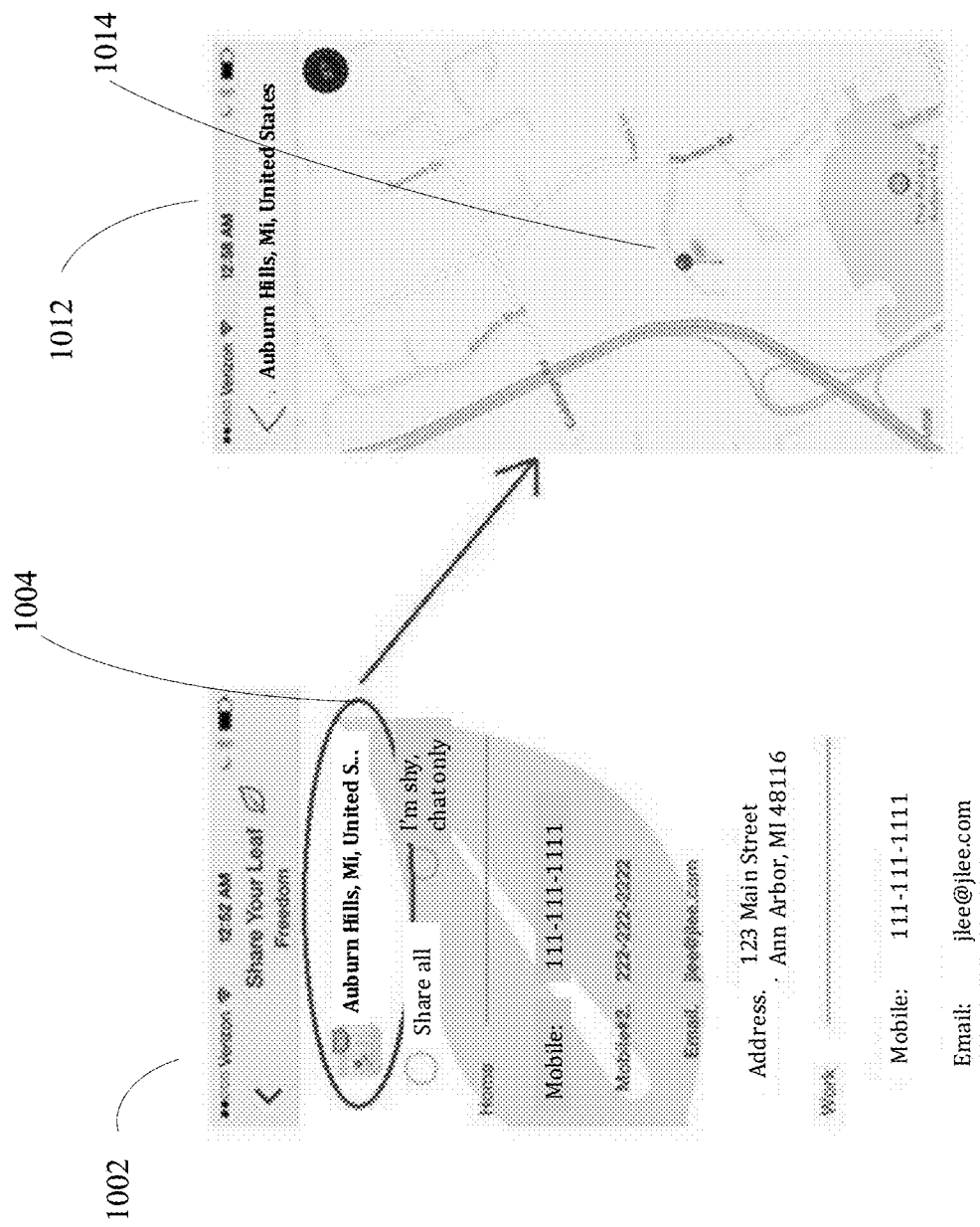
FIG. 10 is a diagram of an example of a user interface display for selecting location data for data sharing in accordance with implementations of this disclosure.

FIG. 10 is a diagram of an example of a user interface display for selecting location data for data sharing in accordance with implementations of this disclosure. In some embodiments, an application interface display 1002 may display information related to the data sharing with a new contact and selectable by the user for constructing the contact profile information. For example, the application interface display 1002 may indicate the location information 1004 of the user device when the potential contact was detected and may associate the location information 1004 with the new contact registration as additional contact data. The application interface display 1002 may be responsive to user input, such as by tapping the location information 1004, and may generate an application interface display 1012 that shows a representation of the location information 1004 as a map location 1014. In some embodiments, the user interface unit 150 may be responsive to the user input for adding notes or comments within the new contact registration information as further contact data.

Figure 11:
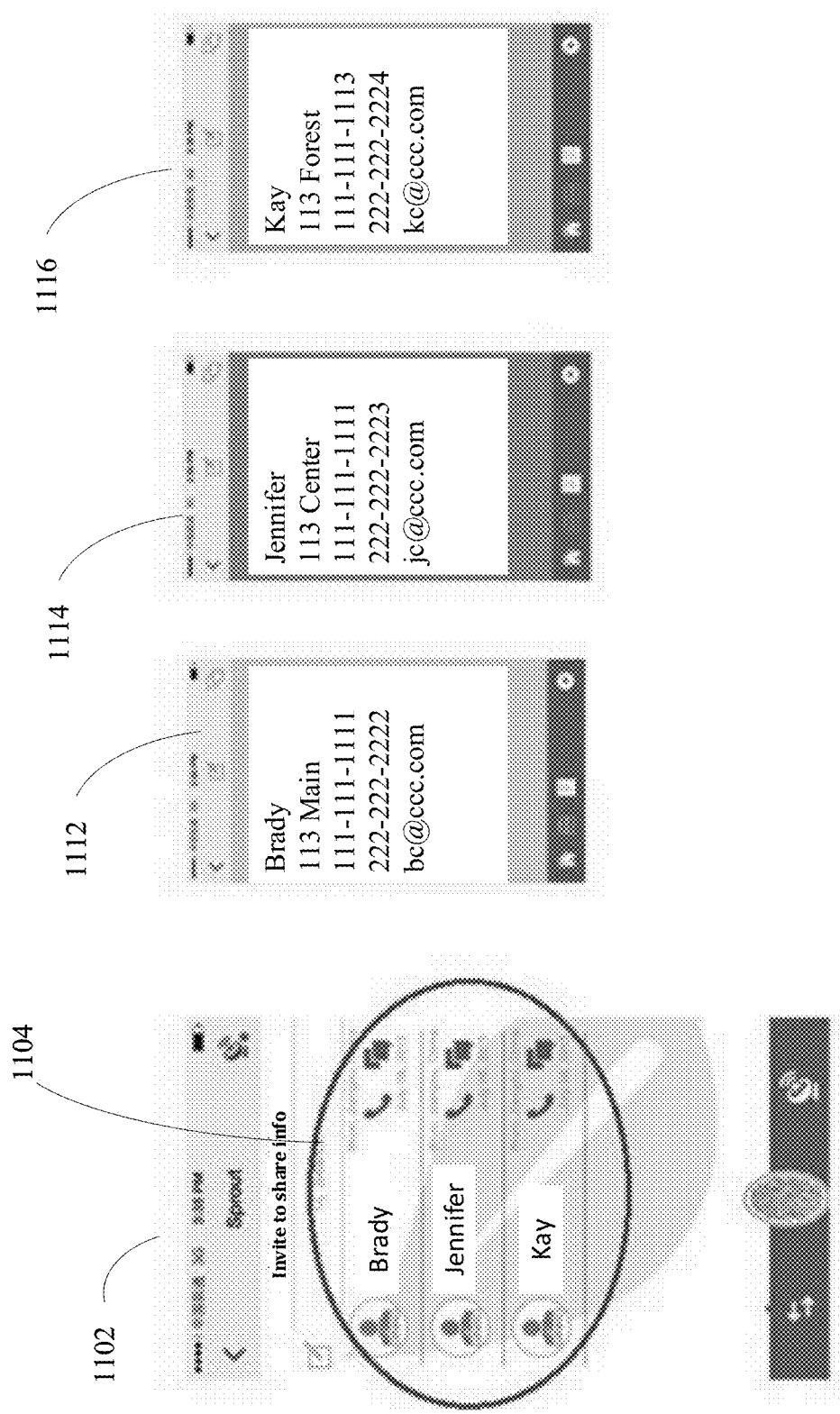
FIG. 11 is a diagram of an example of a user interface display of user data of listed registered contacts in accordance with implementations of this disclosure.

FIG. 11 is a diagram of an example of a user interface display for user data of listed registered contacts in accordance with implementations of this disclosure. In some embodiments, an application interface display 1102 may identify registered contacts as a list in a display region 1104 responsive to user input, such as by tapping on a registered contact identification. For example, in response to tapping on registered contact identification in display region 1104, an associated application interface display 1112/1114/1116 may be generated and displayed on a user interface display, such as the user interface unit 150 of FIG. 1. The application interface display 1112/1114/1116 may show contact data for a given registered contact to be viewed by the user as a contact profile, which may include aspects of the registered contact's account profile, such as the customizable features of profile background pictures and associated media. The viewable contact data for a given registered contact correlates to the permissions set by the registered contact, such as any public user data and/or the private user data that the registered contact has agreed to share.

Figure 12:
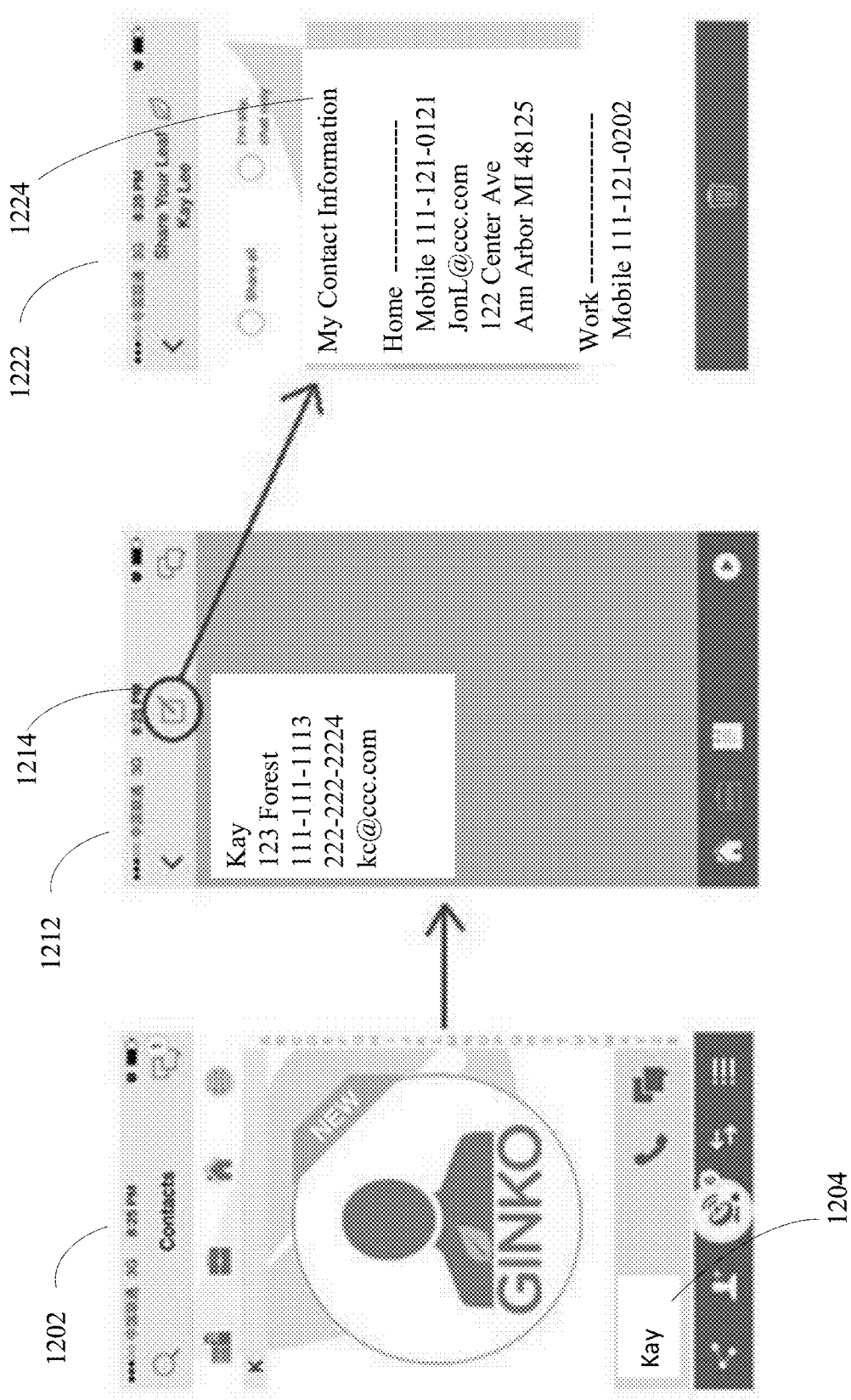
FIG. 12 is a diagram of an example of a user interface display for changing data sharing in accordance with implementations of this disclosure.

FIG. 12 is a diagram of an example of a user interface display for changing data sharing in accordance with implementations of this disclosure. As described herein, and notwithstanding the permissions originally set during an exchange of user data, in some embodiments, the user interface unit 150 may display configurable permission information set for various user data shared with a given registered contact. For example, the permission information may be displayed and may be responsive to user input for electing to share more or share less user data with registered contacts. In some embodiments, an application interface display 1202 may indicate a registered contact in display region 1204, which may be responsive to user input, such as by tapping the display region 1204. In response to the user input, an application interface display 1212 may be generated and displayed to include an editing icon 1214, which may be responsive to a user input. For example, an application interface display 1222 may be generated and displayed to show shared contact information 1224 previously defined for sharing with the registered contact. The shared contact information may be modified in response to user input on the application interface display 1222. For example, the user may select certain shared user data and remove it from the contact data registered with the registered contact, without altering the user account profile information, which may remain intact as user data for future data sharing. In some embodiments, the application interface display 1222 may modify shared user data by deleting an entire contact profile and removing all contact data relating to the registered contact in response to user input. In response to the modification to the contact profile by the user device of the user, the network server 232 may modify the user's contact registration to reflect the deletion, and in turn, may delete all contact data of the user within the registered contact's records.

Figure 13:
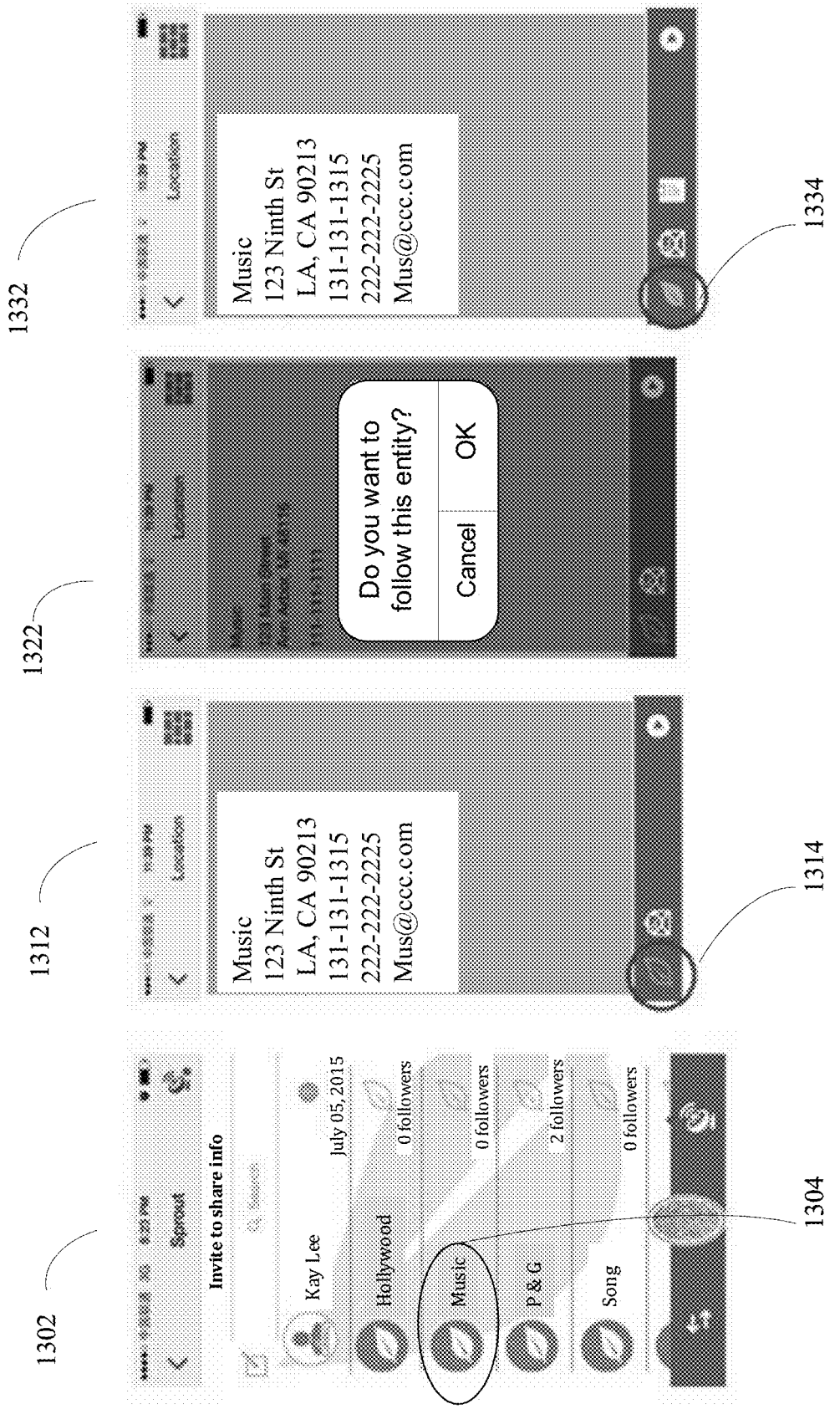
FIG. 13 is a diagram of an example of a user interface display for following registered users in accordance with implementations of this disclosure.

FIG. 13 is a diagram of an example of a user interface display for following registered users in accordance with implementations of this disclosure. In some implementations, an application interface display 1302 may respond to user input for following one or more registered users. For example, a registered user identification appearing in display region 1304 may be responsive to user input, such as by tapping the identification on the display, for selection as an entity to be followed by the user. An application interface display 1312 may be generated and displayed in response to the user input, and may include follow icon 1314. In response to user input, such as by tapping the follow icon 1314, an application interface display 1322 may be generated and displayed with a prompt for the user to confirm that the user has selected to follow the entity. On a condition that the user confirms the selection, the application interface display 1332 may be generated and displayed for indicating that the user device will follow the selected entity. As a result of the user device following the selected entity, the network server 232 may send the entity's posts on the network to the user device, and the posts may be displayed on the user interface as a dedicated content feed viewable by the user.

Figure 14:
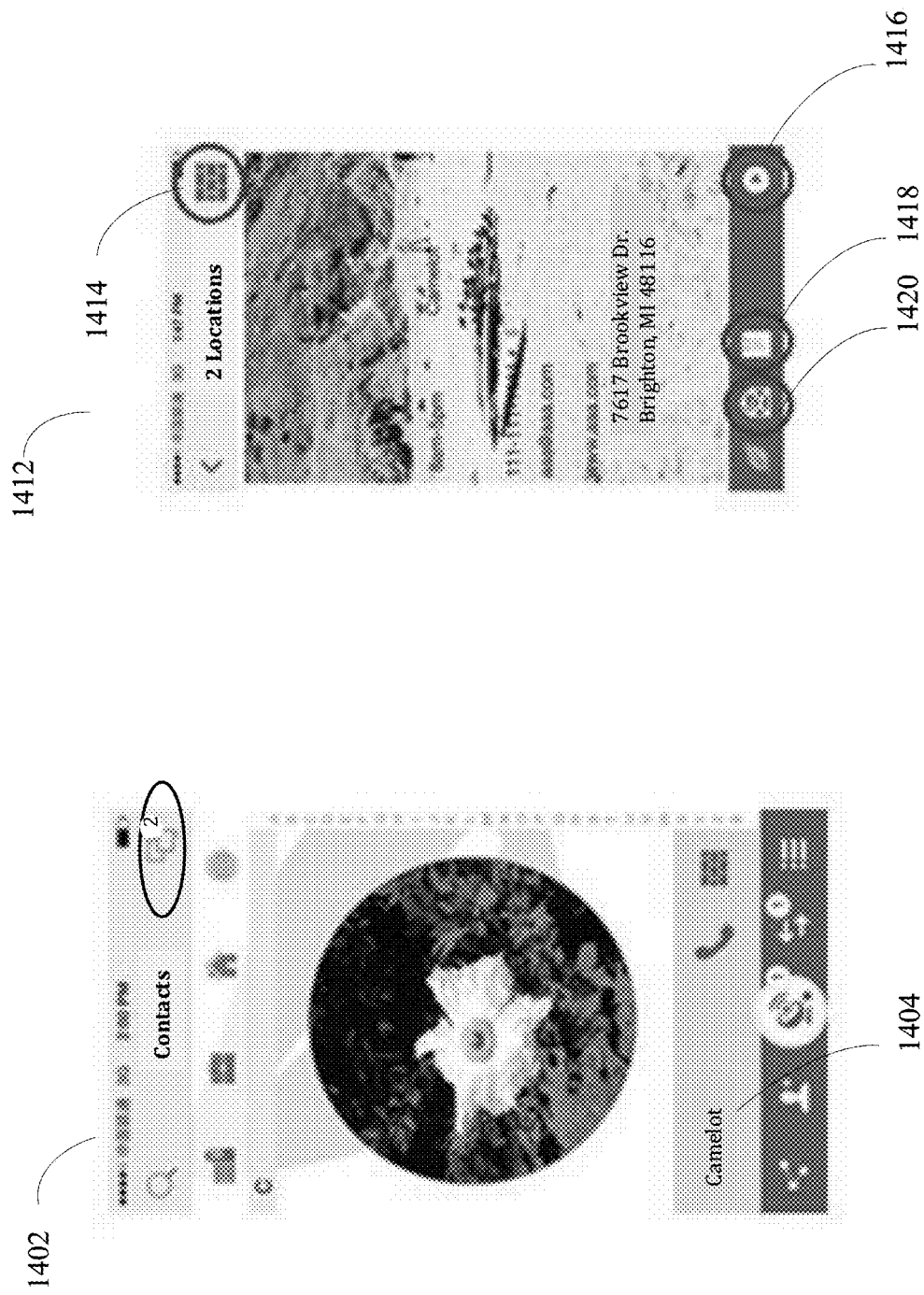
FIG. 14 is a diagram of an example of a user interface display for following registered contacts in accordance with implementations of this disclosure.

FIG. 14 is a diagram of an example of a user interface display for following registered contacts in accordance with implementations of this disclosure. In some embodiments, an application interface display 1402 may show a list of followed contacts in display region 1404, which upon selection by the user, such as by tapping the followed contact identification, an application interface display 1412 may be generated and displayed to show the followed contact's content feed information. In some embodiments, the application interface display 1412 may provide options for the user to view information associated with the followed contact, which may include icons 1414/1416/1418/1420 responsive to user input. For example, the user may view the content feed associated with the followed contact by selecting the media icon 1414, or view media associated with the followed contact by selecting the media icon 1416, record notes or comments about the followed contact within the contact profile by selecting the clipboard icon 1418, or recommend the followed contact to other users by selecting the envelope icon 1420. In some embodiments, only contacts whose user data is set to public may be recommended to other users.

Figure 15:
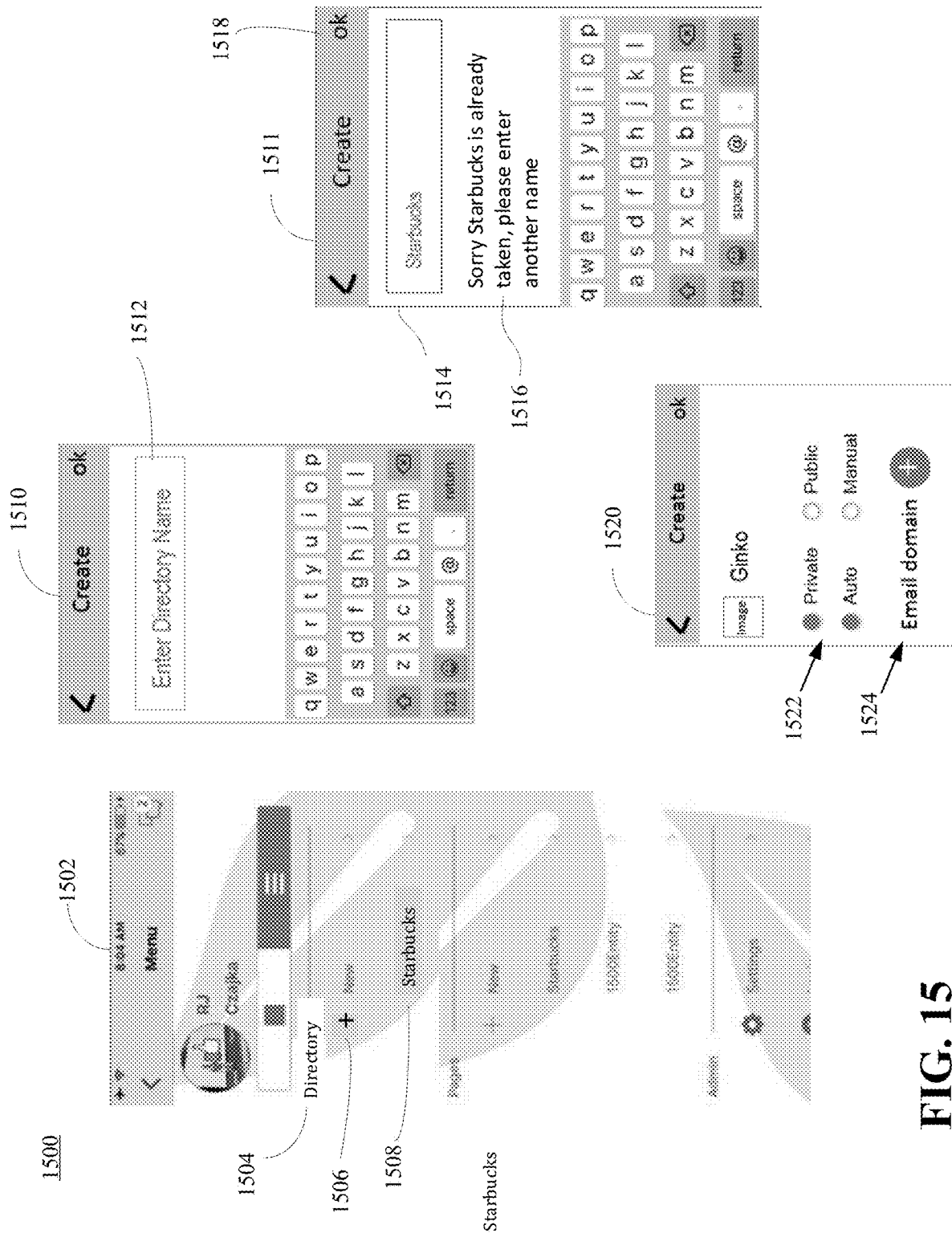
FIG. 15 is a diagram of an example of a user interface display for creating a directory of contacts in accordance with implementations of this disclosure.

FIG. 15 is a diagram of an example 1500 of a user interface display for creating a directory of contacts. The example 1500 illustrates a user home page 1502. The user home page 1502 can be displayed on a user device in accordance with implementations of this disclosure. The user device can be the apparatus 100 of FIG. 1. The user home page 1502 can include an area where directories of contacts created by, or available to, the user are displayed. For example, a section 1504, labeled "Directory," can display the directories created by the user. The section 1504 illustrates that directory 1508 (labeled "Starbucks") is a directory created by the user. The user home page 1502 can include a user interface control that, when invoked, allows the user to create a new directory of contacts. For example, the section 1504 can include the control 1506 (labeled "+New"), which, when invoked (i.e., activated) by the user, permits the user to create a new directory of contacts. The user who creates a directory of contacts is referred to herein as the "administrator" of the directory of contacts.

The example 1500 illustrates a create user interface 1510 that can be presented to the user in response to the user activating the control 1506. The create user interface 1510 can include a data entry field 1512. The user can provide, via the data entry field 1512, a name for the directory of contacts to be created. A create user interface 1511 illustrates that the user has provided a directory name of "Starbucks." In response to the user activating the OK control 1518, a request to create the directory of contacts may be transmitted, from the user device to a server, such as the network server 232 of FIG. 2.

In some implementations, a uniqueness check can be performed by the server to determine whether the directory name provided by the user is unique (i.e., not a duplicate name). In the case where the uniqueness check does not pass (i.e., the name is already used as the name of another directory), then the directory of contacts is not created. For example, since the user already has a directory of contacts named "Starbucks" (i.e., the directory 1508), an error message, such as an error message 1516, can be received from the server indicating that the directory name (i.e., "Starbucks") is already taken and that the user is requested to enter another name.

In some implementations, uniqueness is checked based on the list of directories of the user. For example, if a first user already has a directory named "Ginko," and a second user, who does not have a directory named "Ginko," attempts to create a directory named "Ginko," the request to create the directory "Ginko" succeeds (i.e., the directory is created) because the second user does not have a directory named "Ginko."

In other implementations, directory names are globally unique. That is, the directory names are unique across all users. For example, and referring back to the "Ginko" example, the request from the second user to create a directory named "Ginko" fails because a directory named "Ginko" (i.e., the first user's directory) already exists. In still other implementations, directory name uniqueness is determined based on a subset of users. For example, if the second user's email address is "user2@somecompany.com," uniqueness can be checked based on the directory names of all users in the "somecompany.com" domain. Other ways of determining the subset of the users are available. In still other implementations, uniqueness is not checked and multiple directories having the same name are possible. The uniqueness scope (e.g., user, global, none, domain-based, etc.) can be a server configuration, such as a configuration of the network server 232 of FIG. 2.

In the case where the uniqueness check passes or no uniqueness check is performed, then the user can be presented with another interface (e.g., a settings interface 1520) to provide additional settings for the directory of contacts. The additional settings for the directory can include a permissions setting and directory joining criteria. Permissions can indicate whether a directory is public or private (as further described below). Directory joining criteria can be used to determine whether a user, attempting to join the directory, should be added to the directory (as further described below).

The settings interface 1520 can include a permissions controls 1522 and other controls which can be used by the administrator for providing directory joining criteria. For example, the settings interface 1520 includes a domain setting 1524 for providing directory joining criteria. The settings interface 1520 is further described below with respect to FIGS. 16-17.

Figure 16:
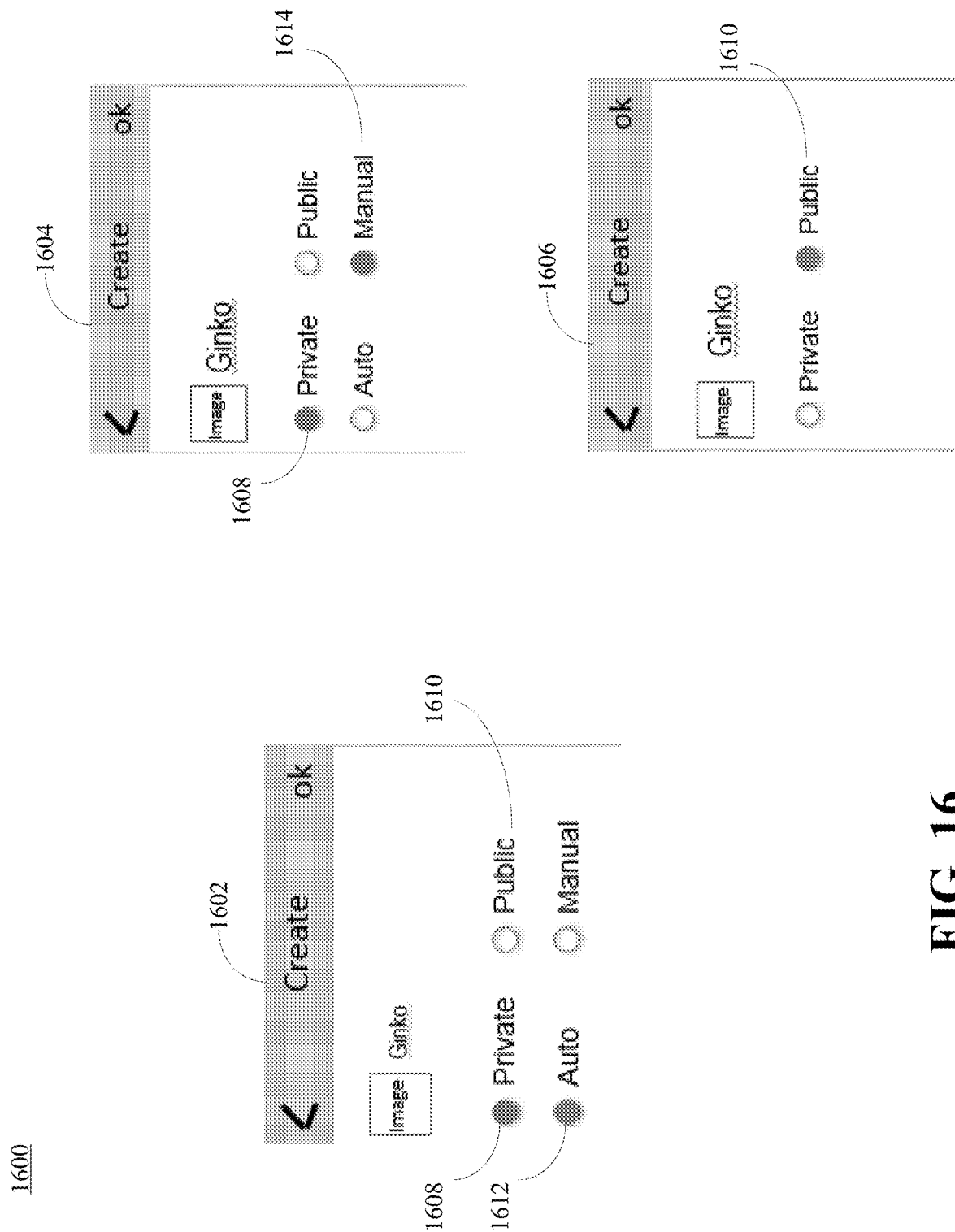
FIG. 16 is a diagram of an example of a user interface display for setting permissions for a directory of contacts in accordance with implementations of this disclosure.

FIG. 16 is a diagram of an example 1600 of a user interface display for setting permissions for a directory of contacts in accordance with implementations of this disclosure. The example 1600 includes the permissions controls 1602, which can be used for setting permissions for a directory of contacts.

The example 1600 illustrates setting permissions via radio buttons. However, other user interface controls are possible. To set the directory to be "private," a control 1608 can be selected. To set the directory to be "public," a control 1610 can be selected. When the control 1608 is selected, controls 1612 and 1614 can become available. That is, when the control 1610 is selected, the controls 1612 and 1614 can be deactivated (i.e., they become unavailable for user selection), hidden, or the like. When the control 1608 is selected, the controls 1612 and 1614 can become active and/or visible. Selecting the combination of the control 1608 and the control 1612 (i.e., as illustrated in the settings of the permissions controls 1602) sets the directory permission to "private-auto." Selecting the combination of control 1608 and the control 1614 (i.e., as illustrated in interface 1604) sets the directory permission to "private-manual." Selecting the control 1610 (i.e., as illustrated in interface 1606) sets the directory permission to "public." Other permissions are also possible. The labels "private-auto," "private-manual," and "public" are merely labels used as short-hand to refer to the semantics associated with each of the labels. Other labels and/or techniques for implementing the semantics associated with these labels can be used.

The semantics of "private-auto," "private-manual," and "public" are now described. A "public" directory can be discoverable (by any means) by any user. For example, a user can discover a directory of contacts by listing the names of all the available directories (i.e., available on a system, such as the network server 232). For example, a user can discover a directory by searching using partial directory names, wild cards, by administrator name, by other criteria, or any combination thereof. A user can discover a directory by receiving a pointer (e.g., a hyperlink, a contact card, etc.) to the directory. The user can discover the directory by other means. Any user can join a "public" directory. By "joining" a directory, the user (i.e., the user's contact information) becomes available in the directory of contacts.

In an example, a "private" directory is not discoverable. In such a case, the user can join the directory of contacts only by receiving an invitation to join the directory. In an example, the invitation must be received from the administrator of the directory. In another example, the invitation can also be received from other members of the directory.

In another implementation, a "private" directory can be discovered. However, when a user requests to join the directory, additional checks may be performed before the user can be joined (i.e., added to the directory). If the directory is "private-manual," the user's request to join the directory is forwarded to the administrator. If the administrator approves the request, then the requesting user is added to the directory.

If the directory is "private-auto," then the directory joining criteria can be checked against the requesting user's contact information to determine whether the user is to be added to the directory. In an example, all criteria must be satisfied for the user to be added. In another example, at least some of the criteria must be satisfied. In another example, each criterion can have a weight and the weighted sum of matched criteria must exceed a threshold value for the user to be added. Other directory joining criteria matching options are possible.

Figure 17:
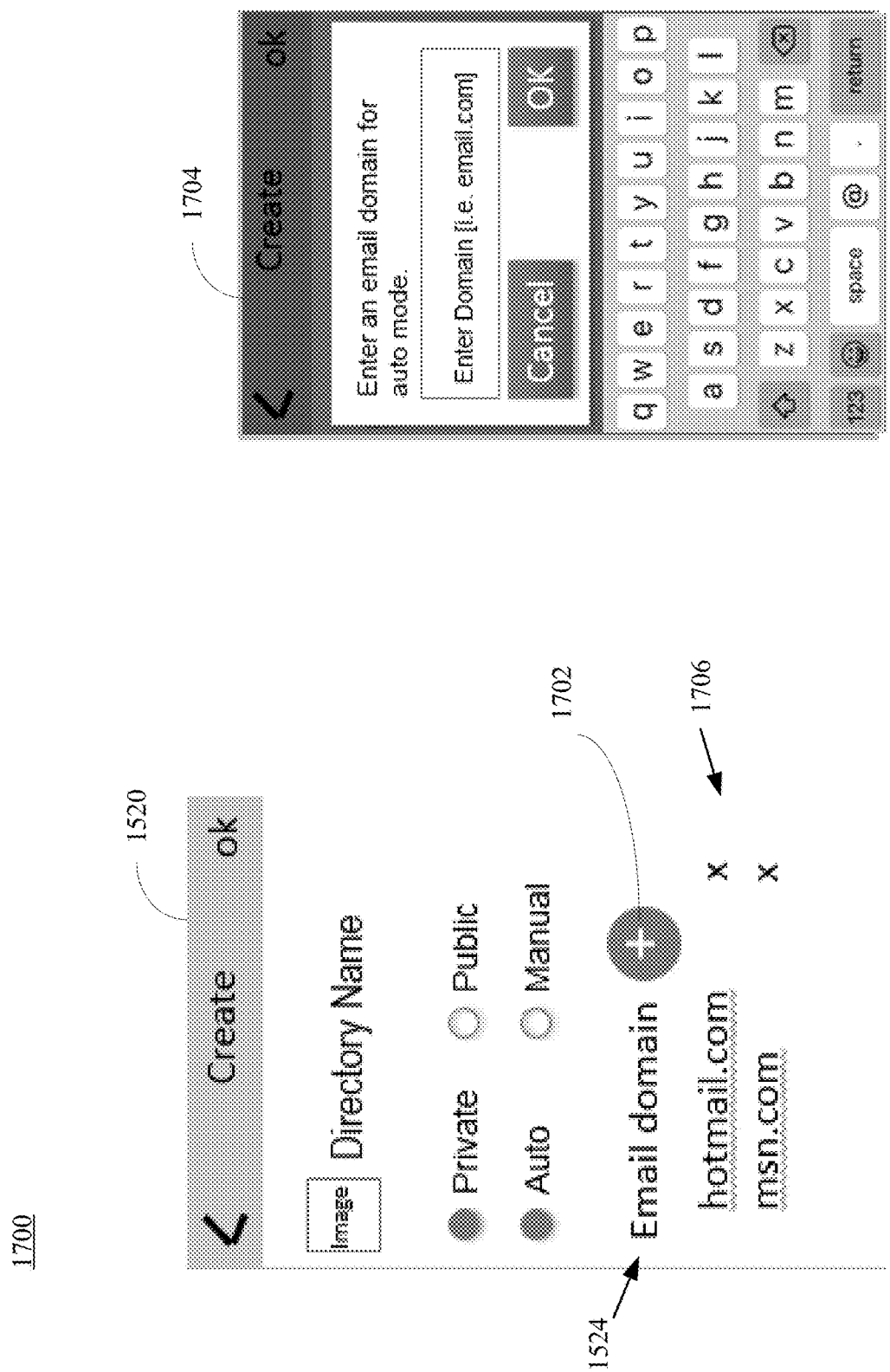
FIG. 17 is a diagram of an example of a user interface display for setting directory joining criteria in accordance with implementations of this disclosure.

FIG. 17 is a diagram of an example 1700 of a user interface display for setting directory joining criteria in accordance with implementations of this disclosure. The example 1700 includes the settings interface 1520 of FIG. 15, which includes the domain setting 1524. The domain setting 1524 includes a control 1702, which, when activated, causes interface 1704 to be displayed. The interface 1704 can be used by the administrator to provide one or more domain names as directory joining criteria. For example, the domains 1706 illustrate that two domains (i.e., "hotmail.com" and "msn.com") were provided via the interface 1704. The domains 1706 can be displayed in the order they were provided by the user or alphabetically. Other ordering and/or sorting of the domains 1706 are possible.

In the example 1520 of directory joining criteria, before a user is added to the directory, the user's contact information can be checked to determine whether the user contact information matches (partially, fully, or otherwise) the directory joining criteria. For example, assume that a user with an email address of "bob@acme.com" requests to join a private-auto directory. Since the user's domain (i.e., "acme.com") does not match any of the domains "hotmail.com" and "msn.com," then the user is not automatically added to the directory. In one example, the user's request is rejected and the user is not added to the directory of contacts. In another example, the system can send a notification, to the user, of the directory joining criteria. For example, the notification can state "To join this directory, your profile must include a @hotmail.com or a @msn.com email address. Please update your profile and try to join again." The notification can be sent via any means. For example, a push notification, an email notification, an application notification, or the like can be used to send the notification to the user. The user can be added to the directory once the user's contact information is updated to match the directory joining criteria. For example, when the requesting user adds a secondary email address (e.g., bob@msn.com) that matches the directory joining criteria, the user can be added to the directory.

Other directory joining criteria are possible. For example, the joining criteria can indicate users to be excluded from the directory. For example a black (i.e., excluded) list of domains (i.e., excluded domain names) can be provided. For example, if the directory is that of an enterprise (e.g., a company), the black list can list the domains of the enterprise's competitors. As such, an employee of a competitor may not be automatically added to the directory. All other users can be automatically added. The directory joining criteria can indicate geographic criteria. As such, the directory joining criteria can include a location-based criterion. For example, the administrator can indicate that only users in the state of Michigan can be automatically added. For example, the administrator can indicate that only users within a 25 mile-radius of the administrator's location can be automatically added. The administrator's location can be based on the user's address, as may be specified in the administrator's profile. The administrator's location may be dynamic. That is, the administrator's location can be based on the location of the administrator's user device at the time that a user request to join the directory is received. The system can use the requesting user's contact information (e.g., address or device location) to determine whether the requesting user matches the criteria.

Figure 18:
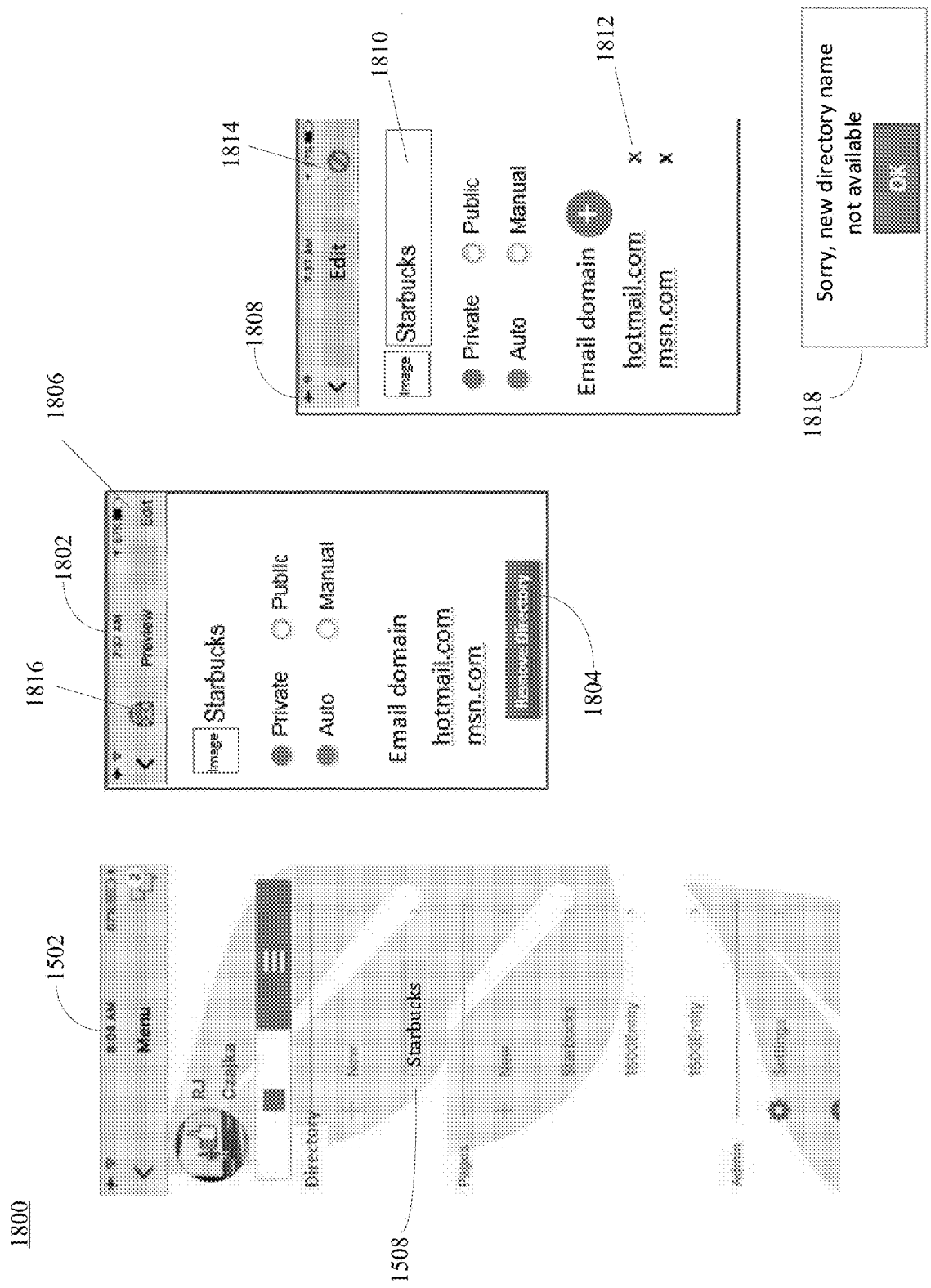
FIG. 18 is a diagram of an example of a user interface display for editing a directory of contacts in accordance with implementations of this disclosure.

FIG. 18 is a diagram of an example 1800 of a user interface display for editing a directory of contacts in accordance with implementations of this disclosure. The example 1800 includes the user home page 1502 of FIG. 15. The example 1800 includes a user interface 1802 for displaying the settings of a directory. For example, in response to an administrator's action (e.g., tapping, double clicking via a pointer, or the like on the directory 1508), the user interface 1802 can be displayed. The user interface 1802 can include a control 1804, which, when activated, causes the directory displayed in the user interface 1802 to be removed. That is, when the control 1804 (labeled "Remove Directory") is activated (e.g., clicked), the Starbucks directory is removed by the system. When a directory is removed, the system can remove the directory from each of the directory's members' list of directories. For example, listing 2002 of FIG. 20 displays a listing of directories for a user. If the directory "Donghia Furniture" (i.e., entry 2006) is removed by the administrator of the directory, then the directory "Donghia Furniture" is removed from the listing 2002.

The user interface 1802 can include an edit control 1806. When invoked, the edit control 1806 causes an edit user interface 1808 to be displayed. The edit user interface 1808 allows the user to modify the name and settings of the directory. The name and settings of the directory are as described with respect to FIGS. 15-17. If the user attempts to modify the name of the directory by providing a new name in the field 1810, the system can perform a uniqueness check as described above. If the uniqueness check fails, an error 1818 can be displayed to indicate to the user that the provided name is not available for use.

The edit user interface 1808 can include a control 1812, which, when invoked for a domain, removes the domain from the directory joining criteria. In one example, when a domain is removed, members of the directory having the removed domain can be removed from the directory and the directory is removed from the removed members' list of directories. In another example, members are not removed from the directory. In either case, the altered joining criteria can apply to new requests to join the directory of contacts. The edit user interface 1808 can include an indicator 1814, which is displayed in the case of unsaved changes. The edit user interface 1808 can also include a control 1816, which, when invoked, can display a requests interface 1902 as described with respect to FIG. 19.

Figure 19:
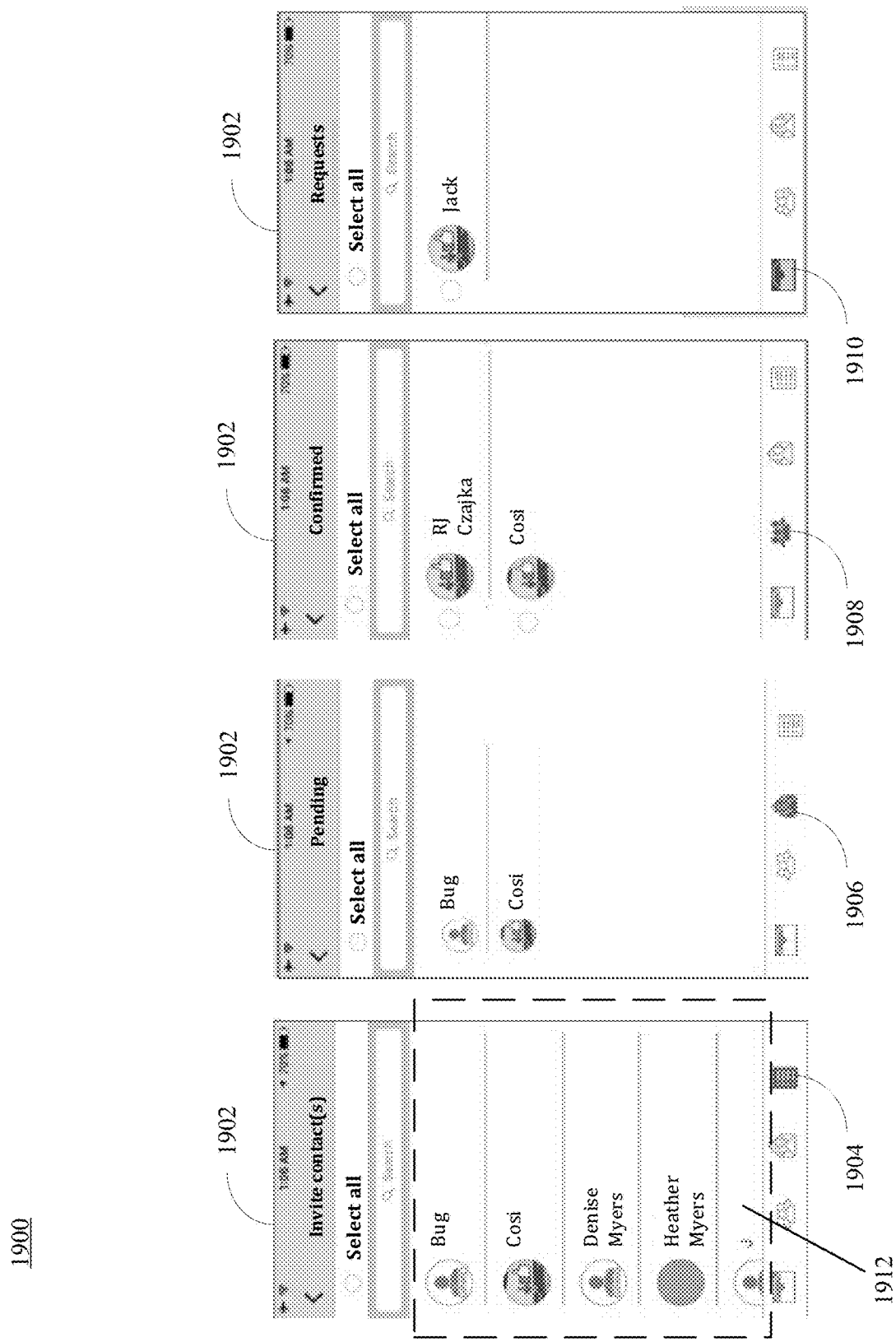
FIG. 19 is a diagram of an example of a user interface display for listing requests associated with a directory of contacts in accordance with implementations of this disclosure.

FIG. 19 is a diagram of an example 1900 of a user interface display for listing requests associated with a directory of contacts in accordance with implementations of this disclosure. The example 1900 includes the requests interface 1902. The requests interface 1902 includes a content area 1912 and controls 1904-1910. The content area 1912 can display different information, depending on which of the controls 1904-1910 is selected.

The control 1904 causes an invite contacts list to be displayed in the content area 1912. The invite contacts list displays a list of the administrator's contacts (i.e., users). The administrator can select one or more of the users listed in the content area 1912 and send requests to the selected user(s) to join the directory. The requests can be sent via the server. That is, a request initiated by the administrator is received and processed by the server. Unless otherwise indicated, a request sent from, or initiated by, an administrator and/or an invitee, such as via a user interface, can be received and processed by the server, such as the network server 232 of FIG. 2. The server can then forward the request to the one or more users. A request can include any action initiated through a user interface where such action affects any aspect of a directory of contacts.

The control 1906 causes a pending list to be displayed in the content area 1912. The pending list displays the list of contacts (i.e., users) to whom the administrator sent a request (i.e., an invite) to join the directory, such as described with respect to the control 1904, but who have not yet accepted the invitation. The requests interface 1902 can include user interface controls that the administrator can use to revoke an invitation. For example, by deleting a user from the pending list, the user's invitation to join the directory can be revoked. A request to revoke the invitation can be received at, and processed by, the server, which revokes the invitation. When an invitee's request is revoked, the invitee cannot accept the invitation to join the directory. In an example, a revoked request can be removed from the invitee's pending requests (described below with respect to FIG. 24). In another example, the revoked request is not removed. However, upon attempting to accept the invitation, the invitee can be notified that the invitation is revoked.

When an invitee (i.e., a user that received a request, or invitation, from an administrator to join a directory) accepts the request, the user becomes a confirmed user. A confirmed user can access the directory. By accessing the directory, the user can have access to the contact information of other users in the directory and can communicate with those other users. The control 1908 causes a confirmed list to be displayed in the content area 1912. The confirmed list is the list of invitees who have accepted the administrator's request to join the directory. The directory administrator can remove users from the confirmed list. A request to remove a user from the confirmed list can be received from the administrator at, and processed by, the server to remove the user from the confirmed list. When a user is removed from the confirmed list, the user can no longer access the directory and the directory can be deleted from user's list of directories. The confirmed list can include the members of a private directory. In an example, the confirmed list can include the members of a public directory. In another example, the confirmed list does not display the members of a public directory.

The control 1910 causes an incoming requests list (i.e., list of incoming requests) to be displayed in the content area 1912. The incoming requests list includes the users who requested access to the administrator's directory. For example, the incoming requests list can be displayed for a private-manual directory. For a private-auto directory, the incoming requests list can include the users who could not be automatically added to the directory because, for example, the users did not satisfy the directory joining criteria. The administrator can accept or reject an incoming request. For example, the user can select one (or more) incoming request(s), and via one control (e.g., a check mark control) accept the selected request(s), and via another control (e.g., a trash can control) reject the request(s). When the administrator accepts a request (i.e., authorizes the access to the directory), the user associated with the accepted request can be added to the confirmed list.

Figure 20:
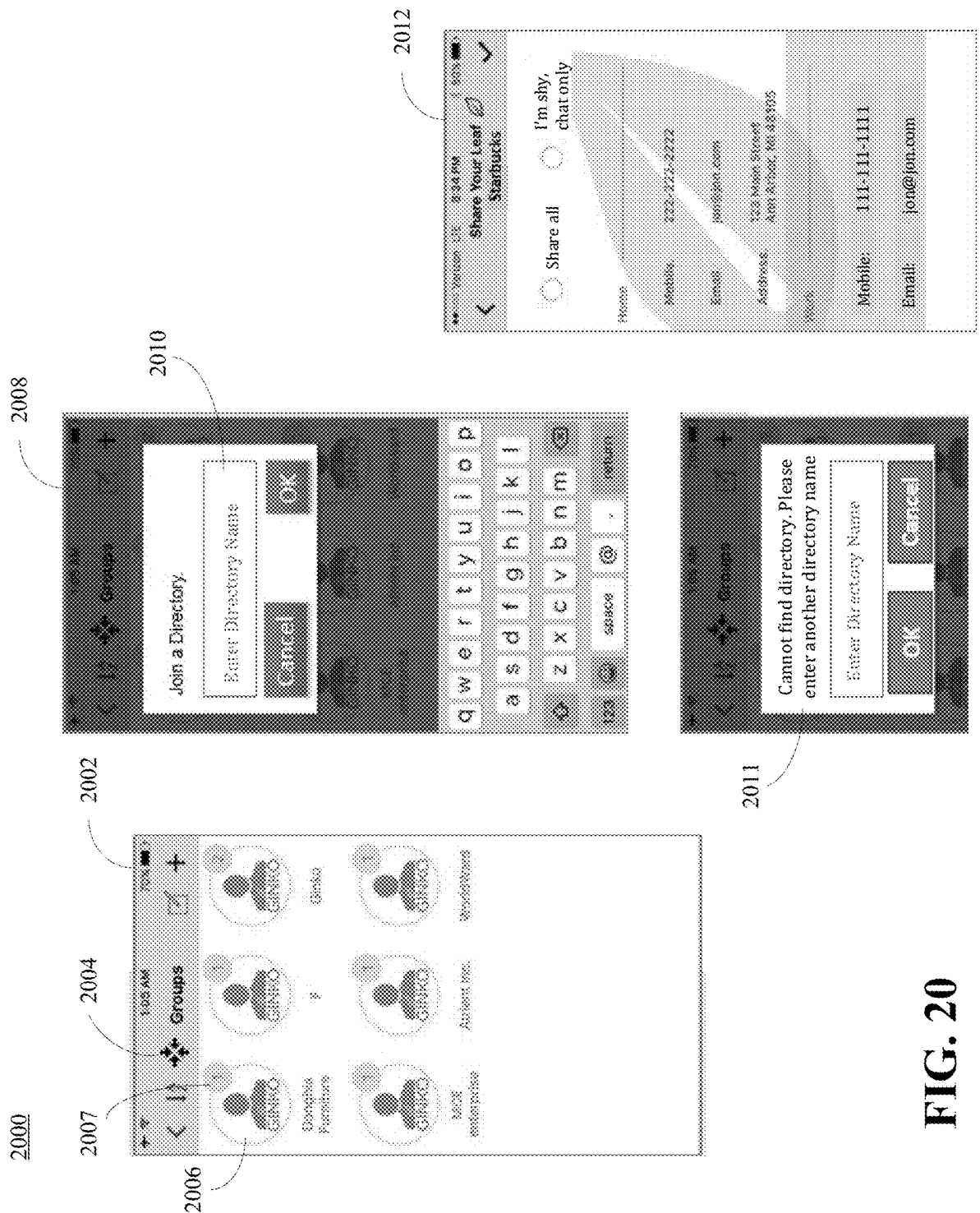
FIG. 20 is a diagram of an example of a user interface display for joining a directory of contacts in accordance with implementations of this disclosure.

FIG. 20 is a diagram of an example 2000 of a user interface display for joining a directory of contacts in accordance with implementations of this disclosure. The example 2000 includes the listing 2002. As described above, the listing 2002 can include entries for directories that the user has joined (i.e., is a member of). For example, the entry 2006 indicates that the user is a member of the directory named "Donghia Furniture," which is created by the administrator "Ginko." The listing 2002 can include other entries in addition to directories of contacts. Items listed in the listing 2002 can include adornments. The adornments can provide additional information regarding an entry in the listing 2002. For example an adornment 2007 can indicate, via a color indicator, the type of the entry. For example, a green color can indicate that the entry 2006 is of type directory of contacts. The adornment can indicate the number of members of the directory. For example, the adornment 2007 indicates that the directory named "Donghia Furniture" includes one user (i.e., one contact information).

Means for joining a directory can be available to the user. For example, to join a directory, the user can activate the control 2004, which, when activated, causes the interface 2008 to be displayed. Via the interface 2008, the user can provide the name, or the partial name, of a directory to join. For example, the user can type in a field 2010 the name of the directory. Other ways can be available for the user to provide a directory name. For example, the user can search for a directory by providing search criteria. For example, the user can scroll and select from a list of all discoverable directories. If the directory provided is not available (e.g., no matching directory found, the directory is not active, the directory is deleted, etc.), then an error message 2011 can be displayed to the user. The error message 2011 can instruct the user that the provided directory could not be found and that the user is to provide another directory name.

If a directory matching the provided name is available, then a permissions interface 2012 similar to the application interface display 822 of FIG. 8 can be presented to the user. Via the permissions interface 2012, the user can indicate whether to share all user data, share some user data, or chat only, in a manner as shown and described herein with respect to FIG. 6, with other members of the directory. A feedback message can be provided to the user after the user provides the sharing information via the permissions interface 2012.

Figure 21:
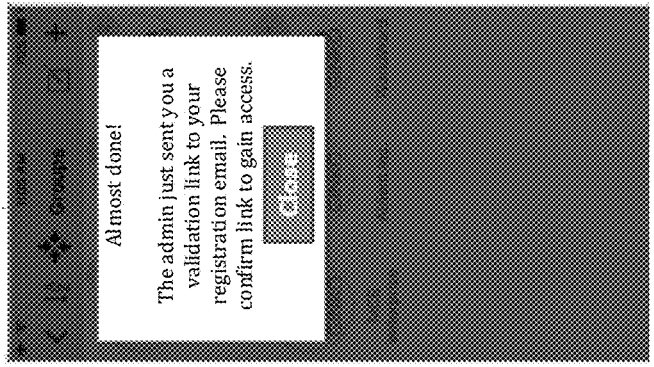
FIG. 21 is a diagram of an example of feedback messages when successfully joining a directory of contacts in accordance with implementations of this disclosure.
Figure 21:
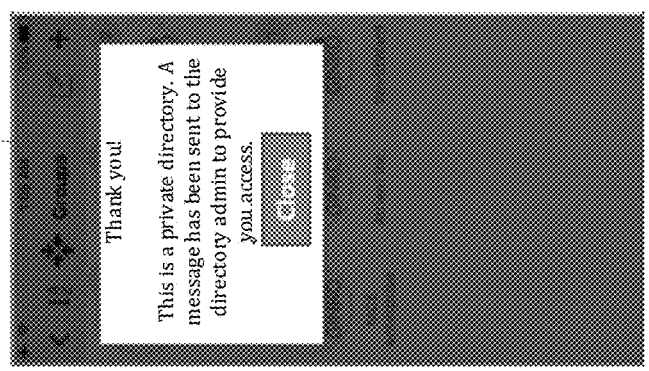
Figure 21:
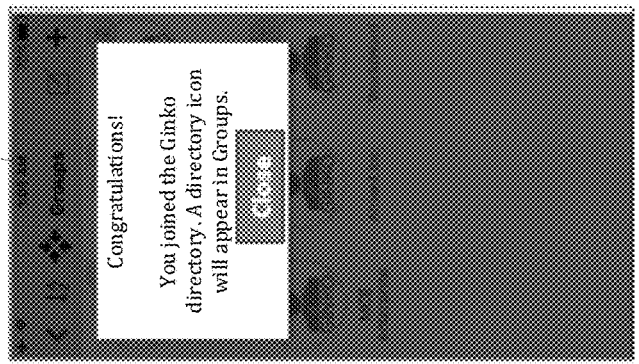
Figure 21:
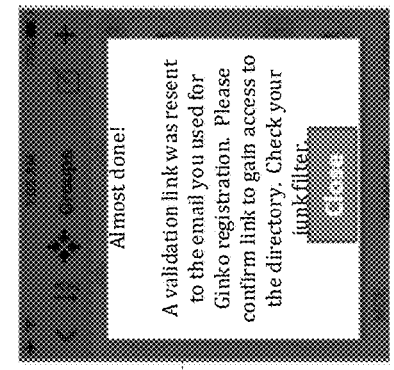
Figure 21:

FIG. 21 is a diagram of an example 2100 of feedback messages when successfully joining a directory of contacts in accordance with implementations of this disclosure. If the directory is a public directory, a message similar to feedback message 2102 can be provided to the user. The feedback message 2102 can indicate that the user has successfully joined the directory and that a directory icon will appear in the listing 2002 of FIG. 20. When a user joins a directory, the user's contact can be added to the administrator's confirmed list as described above with respect to the control 1908 of FIG. 19.

If the directory is a private-manual directory, then a feedback message similar to feedback message 2104 can be provided to the user. The feedback message 2104 can indicate to the user that a notification is sent to the administrator so that the administrator can approve the user's request to join the directory. The notification can be sent, by the server and to the administrator, via any means possible, such as a push notification, email, other means, or a combination thereof. The request to join the directory can also be displayed in the administrator's pending list as described above with respect to the control 1906 of FIG. 19.

If the directory is a private-auto directory, and the directory joining criteria are matched, then a feedback message similar to feedback message 2106 can be provided to the user. The feedback message 2106 can indicate to the user that a validation link is sent to the user's email and that the access to the directory is granted when the user clicks the link. For example, in the case where the directory joining criteria include the domain "msn.com" (as described above with respect to FIG. 17), and the user's contact information includes the email address bob@msn.com, then a validation link can be sent to bob@msn.com. Receiving, such as by the server, an indication that the link is clicked validates that the user's email address bob@msn.com is a valid email address. In some examples, and depending on the directory joining criteria, a different validation technique may be available. In some examples, and depending on the directory joining criteria, no additional validation may be required. For example, if the directory joining criteria are such that "users within a 25 mile-radius of the administrator" can join the directory, no additional validation may be required from the user as the server may determine the matching of the criteria without additional validation from the user. For example, the server can use the user's device location and/or the user's address (if provided in the user's profile) to determine proximity to the administrator. In such cases, a message similar to the feedback message 2102 can be provided to the user.

In the case where the user submits multiple requests to join a private-manual directory, then a feedback message similar to feedback message 2108 can be provided. The feedback message 2108 can indicate that the user's request is pending approval by the directory administrator.

In the case where the user submits multiple requests to join a private-auto directory and the user has not been validated, such as by the user clicking a link that is sent to the user, another validation link can be sent to the user and a feedback message similar to feedback message 2110 can be provided. The feedback message 2110 can indicate to the user that the same (or another) validation link was resent to the user. The feedback message can instruct the user to confirm the link in order to gain access to the directory. The user can confirm the link by, e.g., clicking on the link.

Figure 22:
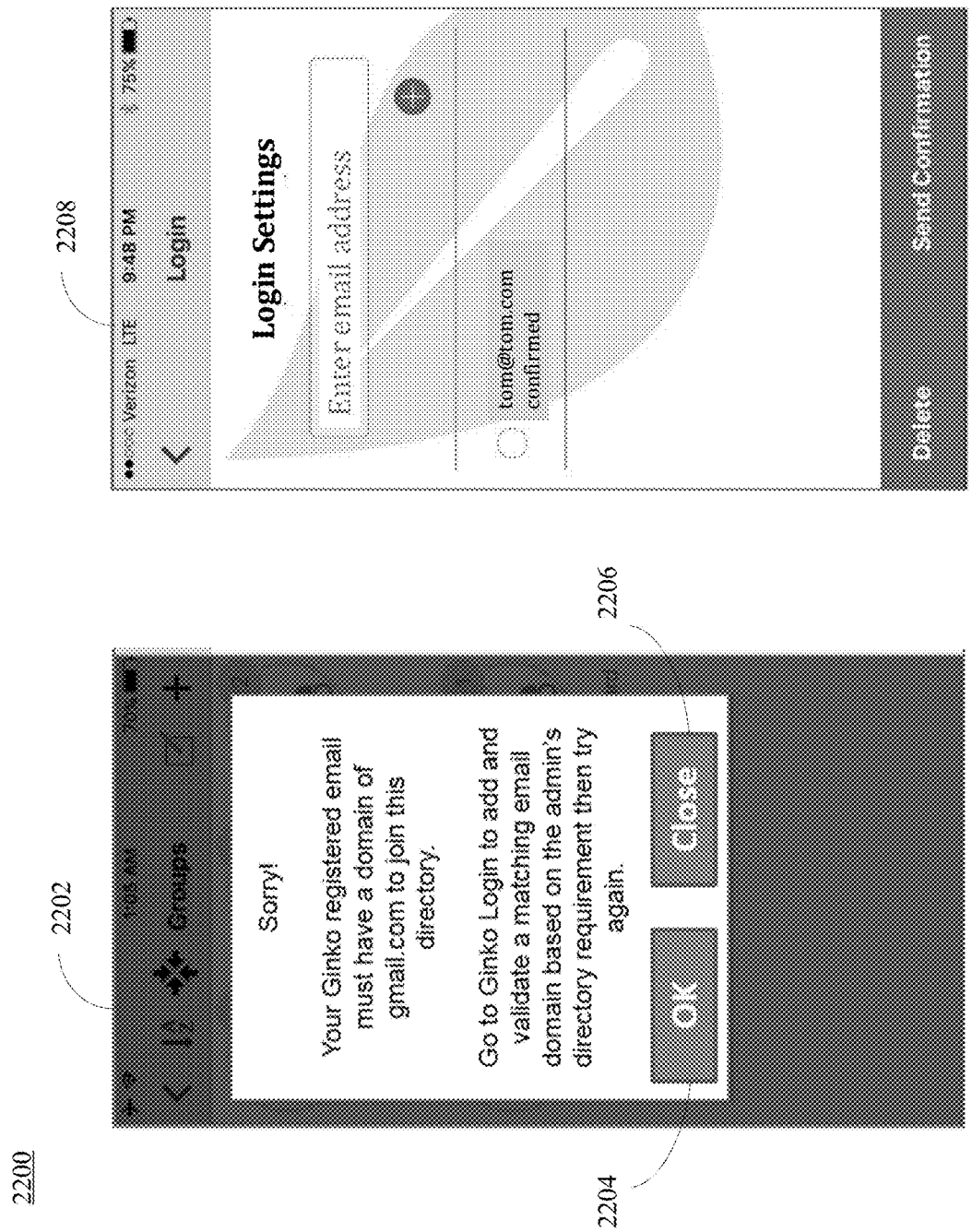
FIG. 22 is a diagram of an example of a feedback message when domain directory joining criteria are not matched in accordance with implementations of this disclosure.

FIG. 22 is a diagram of an example 2200 of a feedback message when domain directory joining criteria are not matched in accordance with implementations of this disclosure. For example, if the user's contact information does include an email address that matches the domain directory joining criteria (as described above with respect to FIG. 17), then a feedback message similar to feedback message 2202 can be provided to the user. The feedback message 2202 can describe to the user the directory joining criteria (e.g., that the user "must have a domain of gmail.com to join the directory"). The feedback message can instruct the user on how to remedy the deficiency so that the directory joining criteria can be matched. For example, the feedback message 2202 can indicate to the user "add and validate a matching email domain" and then "resubmit the request" to join the directory. The user can be navigated to an appropriate user interface to remedy the deficiency. For example, upon activating a button 2204 of the feedback message 2202, the user can be navigated to an interface (e.g., login settings 2208) via which the user can update the user's contact information to include an email with a gmail.com domain. If the user activates a close control (e.g., close button 2206), the request to join the directory can be canceled and the user can be returned to the listing 2002 of FIG. 20.

Figure 23:
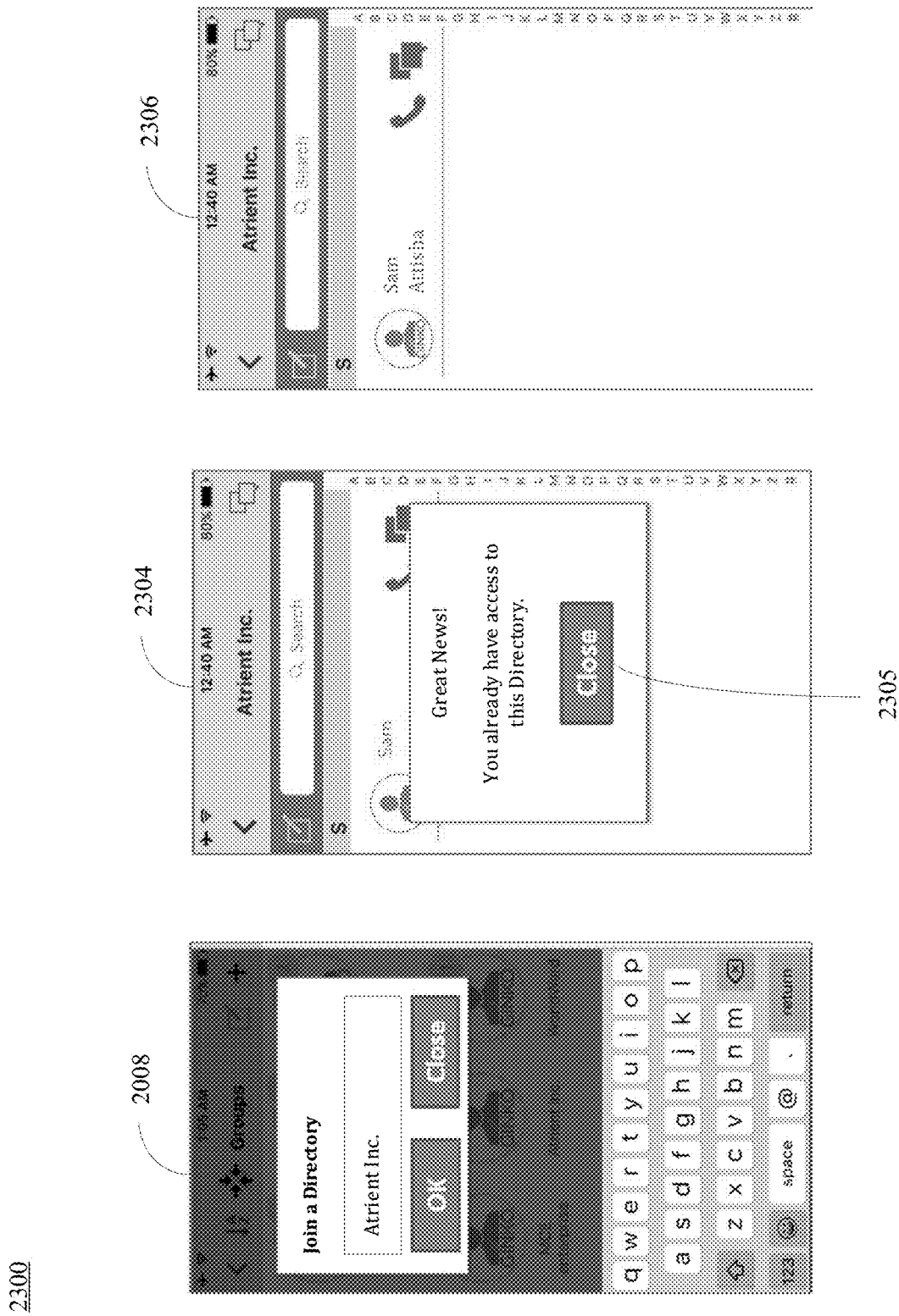
FIG. 23 is a diagram of an example of requesting to join a directory of contacts that is already joined in accordance with implementations of this disclosure.

FIG. 23 is a diagram of an example 2300 of requesting to join a directory of contacts that is already joined in accordance with implementations of this disclosure. In the example 2300, the user requests to join a directory of which the user is already a member. For example, the administrator of the directory may have already granted the user access to the directory. In the interface 2008 (described above with respect to FIG. 20), the user requests to join a directory named "Atrient Inc.," which the user has already joined. A feedback message, such as feedback message 2304, can indicate to the user that the user already has "access to this directory." Upon acknowledging the feedback message (e.g., by activating a close button 2305), the user can be navigated to the directory. For example, upon activating the close button 2305, user interface 2306 can be displayed. The user interface 2306 can list the members of the directory of contacts (e.g., "Atrient Inc.").

Figure 24:
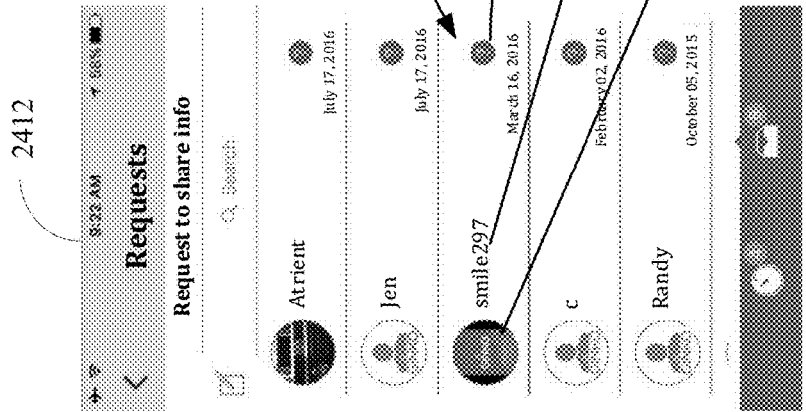
FIG. 24 is a diagram of an example of requests issued by and requests received by a user to join a directory of contacts in accordance with implementations of this disclosure.
Figure 24:
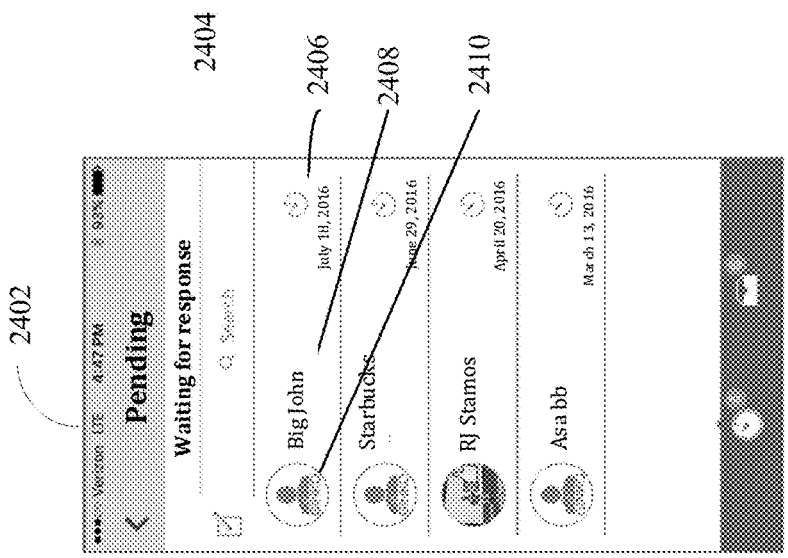

FIG. 24 is a diagram of an example 2400 of requests issued by and requests received by a user to join a directory of contacts in accordance with implementations of this disclosure. The listing 2402 displays the list of requests initiated by the user. That is, the listing 2402 displays the list of requests to join directories that the user of the listing 2402 initiated. For example, the request 2404 indicates that it is a request that the user sent on Jul. 18, 2016 (request date 2406) to the administrator "Ginko" (directory administrator 2410) to join the directory named "Big John" (directory name 2408). While a request is pending, the user can modify the permission level (for example, as described with respect to the permissions interface 2012 of FIG. 20). While a request is pending, the user can cancel the request to join the directory. If the request is canceled, then the request can be removed from the administrator's pending list as described above with respect to the control 1906 of FIG. 19. That is, for example, the server can receive a cancellation request from the user and, in response, remove the incoming request from the list of incoming requests and/or pending requests.

The listing 2412 displays the list of requests (i.e., invitations) that the user received from administrators to join respective directories of the administrators. For example, the invitation 2414 is received on Mar. 16, 2016 (invitation date 2416) from administrator "Ginko" (directory administrator 2420) to join the directory "smile927" (directory name 2418). The user can reject a request (for example, by deleting the request). If a request is rejected, the administrator can be notified that the user rejected the request to join the directory. The user can accept the invitation. If the user accepts the invitation, the user can provide the permission level. For example, the user can be navigated to the permissions interface 2012 as described with respect to FIG. 20. The user can modify to permission level at any time while the user is a member of the directory.

Figure 25:
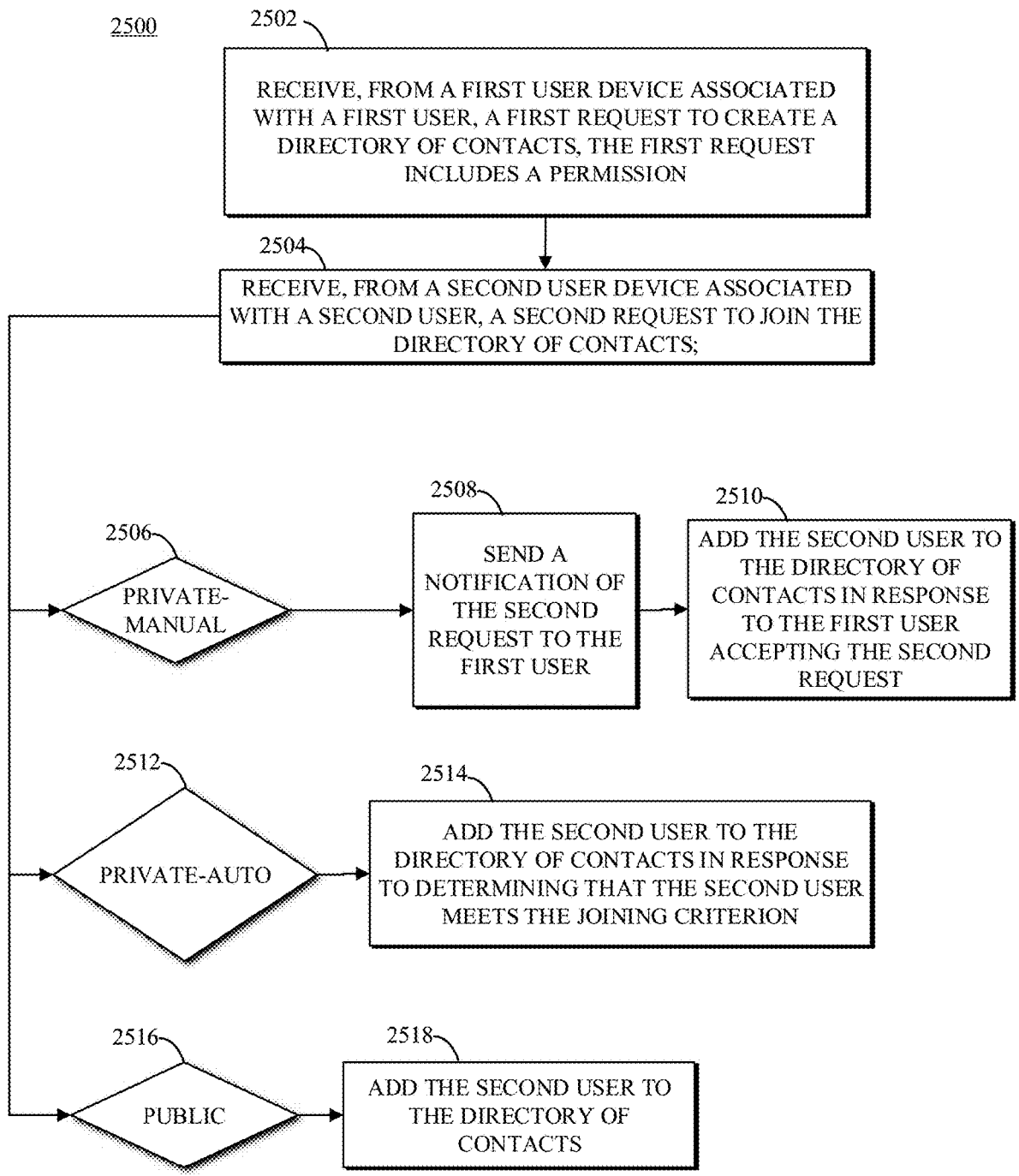
FIG. 25 is a process for creating a directory of contacts in accordance with an implementation of this disclosure.

FIG. 25 is a process 2500 for creating a directory of contacts in accordance with an implementation of this disclosure. The process 2500 can be implemented, for example, as a software program that can be executed by a system such the network server 232 of FIG. 2. The software program can include machine-readable instructions that can be stored in a memory, such as the memory unit 120 of FIG. 1, and that can be executed by a processor, such as the processor 110 of FIG. 1, to cause the system to perform the process 2500. The process 2500 can implement teachings consistent with the descriptions of FIGS. 1-24.

At 2502, the process 2500 receives a first request to create the directory of contacts. The request can be received from a first user device, such as the user device 202 or 212 of FIG. 2. The first user device can be associated with a first user. The first user can be an administrator. The request can be consistent with a request as described with respect to FIG. 15. The request can include a permission. The permission can be a permission consistent with the permissions described with respect to FIG. 16. That is, the permission can indicate that the directory can be a private-auto, a private-manual, or a public directory of contacts.

At 2504, the process 2500 receives a second request to join the directory of contacts. The request can be received from a second user device, such as the user device 202 or 212 of FIG. 2. The second request can be a request that is consistent with a request described with respect to FIG. 20.

At 2506, on a condition that the permission includes a first indicator that the directory of contacts is private-manual, the process 2500 performs 2508 and 2510. For example, if the directory is private-manual, then the process 2500 can perform 2508 and 2510. At 2508, the process 2500 can sent a notification of the second request to the first user. For example, the process 2500 can send the notification to the administrator of the directory as described with respect to FIG. 20 and the feedback message 2104 of FIG. 21. At 2510, the process 2500 adds the second user to the directory of contacts in response to the second user accepting the first request. For example, the second user is added to the directory when the administrator of the directory of contacts accepts the request from the second user to join the directory as described with respect to the requests interface 1902 of FIG. 19.

At 2512, on a condition that the permission includes a second indicator that the directory of contacts is private-auto and the first request includes a directory joining criterion, the process 2500 proceeds to 2514. The directory joining criterion can be as described with respect to FIG. 15. At 2514, in response to determining that the second user meets the directory joining criterion, the process 2500 adds the second user to the directory of contacts. The process 2500 can determine that the second user meets the directory joining criterion as described with respect to FIGS. 17 and 22.

At 2514, on a condition that the permission comprises a third indicator that the directory of contacts is a public directory, the process 2500 adds the second user to the directory of contacts. If the directory of contacts is set up as a public directory (for example, as described with respect to the control 1610 of FIG. 16), the process 2500 can add the user to a public library consistent with the description of FIG. 20 and the feedback message 2102 of FIG. 21.

In an example, and as described with respect to FIGS. 17-18, the directory joining criterion can include a domain name. As such, determining that the second user meets the directory joining criterion includes determining that a profile of the second user comprises an email address that includes the domain name.

In an example, and as described above with respect to the black list, the directory joining criterion can include an excluded domain name. As such, determining that the second user meets the directory joining criterion can include determining that a profile of the second user does not include an email address that includes the excluded domain name. In an example, and as described with respect to FIG. 19, in response to determining that the second user does not meet the directory joining criterion, an incoming request can be added to a list of incoming requests of the first user (i.e., the administrator of the directory of contacts). In an example, and as described above, the user can be added to the directory of contacts when the administrator accepts the incoming request. That is, in response to receiving an acceptance of the incoming request from the first user, the second user can be added to the directory of contacts. In an example, as described with respect to FIG. 24, the second user can cancel the request to join the directory. In response to receiving the cancellation request, the request to join the directory can be removed from the list of incoming requests of the first user (i.e., the administrator of the directory).

Figure 26:
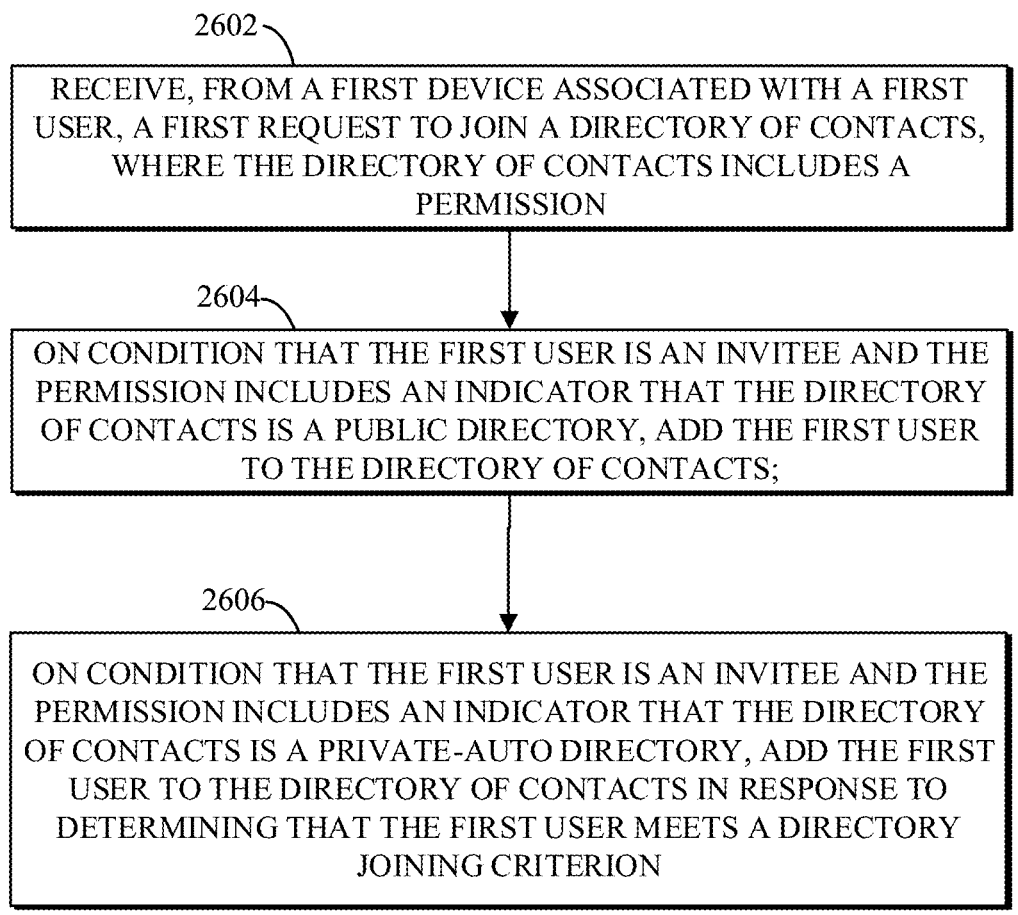
FIG. 26 is a process for joining a directory of contacts in accordance with an implementation of this disclosure.

FIG. 26 is a process 2600 for joining a directory of contacts in accordance with an implementation of this disclosure. The process 2600 can be implemented, for example, as a software program that can be executed by a system such the network server 232 of FIG. 2. The software program can include machine-readable instructions that can be stored in a memory, such as the memory unit 120 of FIG. 1, and that can be executed by a processor, such as the processor 110 of FIG. 1, to cause the system to perform the process 2600. The process 2600 can implement teachings consistent with the descriptions of FIGS. 1-24.

At 2602, the process 2600 receives a first request to join the directory of contacts. The request can be received from a first device associated with a first user, such as the user device 202 or 212 of FIG. 2. The first user device can be associated with a first user. The first user can be an administrator. The request can be consistent with the description of the control 1904 of FIG. 19. The request can be a request sent from the administrator of a directory of contacts to an invitee. The request constitutes an invitation to the invitee to join the directory. The directory of contacts includes a permission. The permission can be a permission consistent with the permissions described with respect to FIG. 16. That is, the permission can indicate that the directory can be a private-auto, a private-manual, or a public directory of contacts.

At 2604, on a condition that the first user is an invitee and the permission indicates that the directory of contacts is a public directory, the process 2600 adds the first user to the directory of contacts.

At 2606, on a condition that the first user is an invitee and the permission indicates that the directory of contacts is a private-auto directory, the process 2600 adds the first user to the directory of contacts in response to determining that the first user meets a directory joining criterion. The directory joining criteria can be as described with respect to FIG. 15.

In an example, and as described with respect to FIG. 18, the process 2600 can include receiving, from the administrator of the directory of contacts, a modification of the permission. The modification of the permission can cause the first user to no longer meet the directory joining criterion. In an example, when a user no longer meets to permission, the user is removed from the directory of contacts.

In an example, an administrator of the directory of contacts can invite (such as described with respect to the control 1904 of FIG. 19) a user from the list of the administrator's contacts to join the directory of contacts. If an invitation is initiated by the administrator of the directory of contacts, the invitee can be added to the directory of contacts without checking the permissions of the directory of contacts. As such, the process 2600 can include receiving, from a second device associated with a second user, a second request to join the directory of contacts; and on condition that the second request is in response to an invitation from an administrator of the directory of contacts, adding the second user to the directory of contacts without checking the permission.

In an example, permissions are not checked in response to a system configuration and/or a directory of contacts setting to "ignore permissions" when invitations are sent by the administrator of the directory of contacts. For example, a profile of the administrator can include a setting that the administrator can toggle to "ignore permissions" or to "check permissions" for invitations sent by the administrator. In another example, a setting can be associated with a particular directory of contacts to "ignore permissions" or to "check permissions." For example, the settings interface 1520 of FIG. 15 can include a user interface control (now shown) that allows the administrator of the directory of contacts to select either "ignore permissions" or "check permissions."

In an example, an administrator of a directory of contacts can remove any user from the directory of contacts. When the administrator of the directory of contacts removes a user from the directory of contacts, the directory of contacts can be silently (e.g., without notification to the user) from the user's list of directory (such as the listing 2002 of FIG. 20).

In an example, an administrator of a directory of contacts can, at any time, remove himself/herself from and/or add himself/herself to any directory that the administrator creates or administers.

For simplicity of explanation, the processes 300, 2500, and 2600 are depicted and described as a series of steps. However, steps in accordance with this disclosure can occur in various orders, concurrently, and/or iteratively. Additionally, other steps or operations not presented and described herein may be used.

Furthermore, not all illustrated steps or operations may be required to implement a technique in accordance with the disclosed subject matter. For example, some implementations of the process 2500 may not include the one or more of the sequence of steps 2506-2510, the sequence of steps 2512-2514, and/or the sequence of steps 2516-2518. For example, some implementations of the process 2600 may not include one of steps 2604 or 2606.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for creating a private directory of contacts, comprising:
   receiving, from a first user device associated with a first user, a first request to create the private directory of contacts, the first request including a directory joining criterion;
   creating the private directory of contacts;
   receiving, from a second user device associated with a second user, a second request to join the private directory of contacts;
   in response to determining that the second user meets the directory joining criterion, adding the second user to the private directory of contacts; and
   in response to determining that the second user does not meet the directory joining criterion, adding an incoming request, indicative of the second request, to a list of incoming requests of the first user.

2. The method of claim 1, wherein the directory joining criterion is a location-based joining criterion.

3. The method of claim 2, wherein the location-based joining criterion is a dynamic location-based joining criterion.

4. The method of claim 3, wherein determining that the second user meets the directory joining criterion comprising:
   determining that, at a time of the second request, a second location of the second user device meets the dynamic location-based joining criterion based on a first location of the first user device.

5. The method of claim 1,
   wherein the directory joining criterion comprises a domain name, and
   wherein determining that the second user meets the directory joining criterion comprising:
      determining that a profile of the second user comprises an email address that includes the domain name.

6. The method of claim 5, wherein in response to determining that the second user does not meet the directory joining criterion, further comprising:
   receiving, from the first user, an acceptance of the of the incoming request; and
   in response to receiving the acceptance, adding the second user to the private directory of contacts.

7. The method of claim 1, further comprising:
   receiving, from the second user, a third request to revoke the second request; and in response to the third request, removing the incoming request from the list of incoming requests of the first user.

8. A system for creating a private directory of contacts, comprising:
a processor; and
a memory, the processor configured to execute instructions stored in the memory to:
receive, from a first user device associated with a first user, a first request to create the private directory of contacts, the first request including a directory joining criterion;
create the private directory of contacts;
receive, from a second user device associated with a second user, a second request to join the private directory of contacts;
in response to determining that the second user meets the directory joining criterion, add the second user to the private directory of contacts; and
in response to determining that the second user does not meet the directory joining criterion, add an incoming request to a list of incoming requests of the first user.

9. The system of claim 8, wherein the directory joining criterion is a location-based joining criterion.

10. The system of claim 9, wherein the location-based joining criterion is a dynamic location-based joining criterion.

11. The system of claim 10, wherein to determine that the second user meets the directory joining criterion comprises to:
determine that, at a time of the second request, a second location of the second user device meets the dynamic location-based joining criterion based on a first location of the first user device.

12. The system of claim 8,
wherein the directory joining criterion comprises a domain name, and
wherein to determine that the second user meets the directory joining criterion comprises to:
determine that a profile of the second user comprises an email address that includes the domain name.

13. The system of claim 12, wherein in response to determining that the second user does not meet the directory joining criterion, further comprises to:
receive, from the first user, an acceptance of the of the incoming request; and
in response to receiving the acceptance, add the second user to the private directory of contacts.

14. The system of claim 8, wherein the instructions further comprise instructions to:
receive, from the second user, a third request to revoke the second request; and
in response to the third request, remove the incoming request from the list of incoming requests of the first user.

15. A method for creating a directory of contacts, comprising:
presenting, on a device of a first user, a first user interface for creating the directory of contacts, wherein the first user interface comprises a first permission indicator of a first permission, a second permission indicator of a second permission, and third permission indicator of a third permission;
initiating, from the device, a creation request to create the directory of contacts, wherein the creation request comprises one of the first permission, the second permission, or the third permission,
wherein the first permission indicating that the directory of contacts is a public directory, wherein the second permission indicating that the directory of contacts is a private-manual directory, and wherein the third permission indicating that the directory of contacts is a private-auto directory; and
receiving, on the device, a confirmation that the directory of contacts is created.

16. The method of claim 15, further comprising:
receiving, from the first user, a selection of the third permission indicator; and
receiving, from the first user, a directory-joining criterion, wherein the creation request comprises further comprising the directory-joining criterion.

17. The method of claim 16, wherein the directory-joining criterion comprises a location-based criterion.

18. The method of claim 16, wherein the directory-joining criterion comprises a domain-based criterion.

19. The method of claim 16, further comprising:
presenting, on the device, a second user interface indicating a joining request from a second user, wherein the second user does not satisfy the directory-joining criterion.

20. The method of claim 19, further comprising:
initiating, from the device, an adding request to add the second user to the directory of contacts.

* * * * *